United States Patent
Matsumoto et al.

(10) Patent No.: US 10,555,193 B2
(45) Date of Patent: Feb. 4, 2020

(54) USER TERMINAL AND BASE STATION

(71) Applicant: KYOCERA CORPORATION, Kyoto (JP)

(72) Inventors: Naohisa Matsumoto, Higashiomi (JP); Kugo Morita, Higashiomi (JP); Hiroyuki Adachi, Kawasaki (JP); Hiroyuki Urabayashi, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/660,533

(22) Filed: Jul. 26, 2017

(65) Prior Publication Data
US 2017/0325115 A1    Nov. 9, 2017

Related U.S. Application Data

(63) Continuation of application No. PCT/JP2016/051965, filed on Jan. 25, 2016.
(Continued)

(51) Int. Cl.
*H04W 28/08*    (2009.01)
*H04W 16/14*    (2009.01)
(Continued)

(52) U.S. Cl.
CPC .......... *H04W 24/08* (2013.01); *H04W 16/14* (2013.01); *H04W 24/10* (2013.01); *H04W 36/0058* (2018.08)

(58) Field of Classification Search
CPC ............. H04W 24/10; H04W 36/0058; H04W 36/0083; H04W 36/0085; H04W 36/0088
See application file for complete search history.

(56) References Cited

U.S. PATENT DOCUMENTS

2010/0054182 A1    3/2010   Bachir et al.
2011/0013600 A1*   1/2011   Kim ...................... H04L 5/0085
                                                           370/332
(Continued)

FOREIGN PATENT DOCUMENTS

JP    2009-542070 A    11/2009
WO    2013/138708 A1   9/2013
(Continued)

OTHER PUBLICATIONS

Author Unknown, Discussion on LAA cell discovery and RRM measurement mechanisms, Nov. 21, 2014, pp. 1-4 (Year: 2014).*
(Continued)

*Primary Examiner* — Christopher M Crutchfield
(74) *Attorney, Agent, or Firm* — Studebaker & Brackett PC

(57) ABSTRACT

A user terminal according to a first feature is used in a mobile communication system. The use terminal includes: a receiver configured to receive a measurement instruction to instruct measurement in an unlicensed band, from a base station; a controller configured to, in response to reception of the measurement instruction, search for a radio signal transmitted in a frequency channel included in the unlicensed band, and measure reception power of the radio signal detected by the search, even when a cell identifier of a measurement target cell is not designated in the measurement instruction; and a transmitter configured to transmit a measurement report including an identifier of a transmission source of the detected radio signal and a measurement result of the reception power, to the base station.

9 Claims, 26 Drawing Sheets

Related U.S. Application Data

(60) Provisional application No. 62/110,116, filed on Jan. 30, 2015, provisional application No. 62/134,197, filed on Mar. 17, 2015, provisional application No. 62/145,851, filed on Apr. 10, 2015, provisional application No. 62/203,575, filed on Aug. 11, 2015.

(51) Int. Cl.
  *H04W 24/10* (2009.01)
  *H04W 36/00* (2009.01)
  *H04W 24/08* (2009.01)

(56) References Cited

U.S. PATENT DOCUMENTS

| | | | |
|---|---|---|---|
| 2013/0217385 A1* | 8/2013 | Das | H04W 48/16 455/434 |
| 2014/0119178 A1* | 5/2014 | Zhao | H04W 28/0268 370/230 |
| 2015/0078360 A1 | 3/2015 | Wang et al. | |
| 2015/0264699 A1* | 9/2015 | Fwu | H04L 5/003 370/329 |
| 2015/0296447 A1* | 10/2015 | Luo | H04W 48/16 370/338 |
| 2016/0029295 A1 | 1/2016 | Nagasaka et al. | |
| 2016/0227416 A1* | 8/2016 | Suzuki | H04W 72/0453 |
| 2016/0262091 A1* | 9/2016 | Harada | H04W 16/32 |
| 2017/0094528 A1* | 3/2017 | Takeda | H04W 16/14 |
| 2017/0311206 A1* | 10/2017 | Ryoo | H04W 24/08 |

FOREIGN PATENT DOCUMENTS

| | | |
|---|---|---|
| WO | 2013/166963 A1 | 11/2013 |
| WO | 2014/064891 A1 | 5/2014 |
| WO | 2014/089069 A1 | 6/2014 |
| WO | 2014/162905 A1 | 10/2014 |

OTHER PUBLICATIONS

Author Unknown, Discussion on LAA Synchronization and Discovery, pp. 1-4, Nov. 21, 2014 (Year: 2014).*
Author Unknown, Measurement and synchronization in LAA, pp. 1-4, Nov. 21, 2014 (Year: 2014).*
Author Unknown, Measurement and Synchronization for LAA-LTE, pp. 1-2, Nov. 21, 2014 (Year: 2014).*
An Office Action issued by the Japanese Patent Office dated Nov. 14, 2017, which corresponds to Japanese Patent Application No. 2016-572006 and is related to U.S. Appl. No. 15/660,533; with English language concise explanation.
International Search Report issued in PCT/JP2016/051965; dated Apr. 12, 2016.
3rd Generation Partnership Project; Technical Specification Group Radio Access Network; Study on Licensed-Assisted Access to Unlicensed Spectrum; 3GPP TR 36.889 V0.1.1; Nov. 2014; pp. 1-40; Release 13; 3GPP Organizational Partners.
Kyocera; Further considerations on the essential functionalities for LAA; 3GPP TSG RAN WG1 Meeting #79; R1-144955; Nov. 17-21, 2014; pp. 1-11; San Francisco, USA.
ITL Inc.; Discussion on Channel Access Mechanism based on LBT for LAA; 3GPP TSG RAN WG1 Meeting #79; R1-145109; Nov. 17-21, 2014; pp. 1-7; San Francisco, USA.
Broadcom Corporation et al.; Robust Coexistence LAA-LTE; 3GPP TSG RAN WG1 Meeting #79; R1-145167; Nov. 17-21, 2014; pp. 1-10; San Francisco, USA.
Alcatel-Lucent, Alcatel-Lucent Shanghai Bell, Channel Selection for Licensed-Assisted Access, 3GPP TSG RAN WG1 Meeting #79, R1-144702, Nov. 17-21, 2014, pp. 2-6, San Francisco, USA.

* cited by examiner

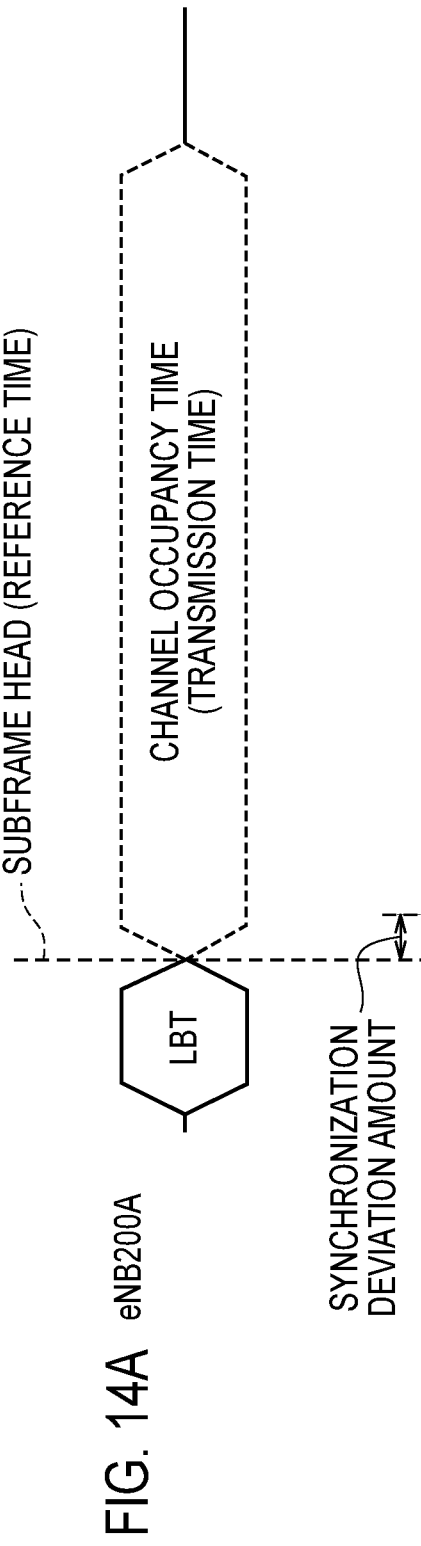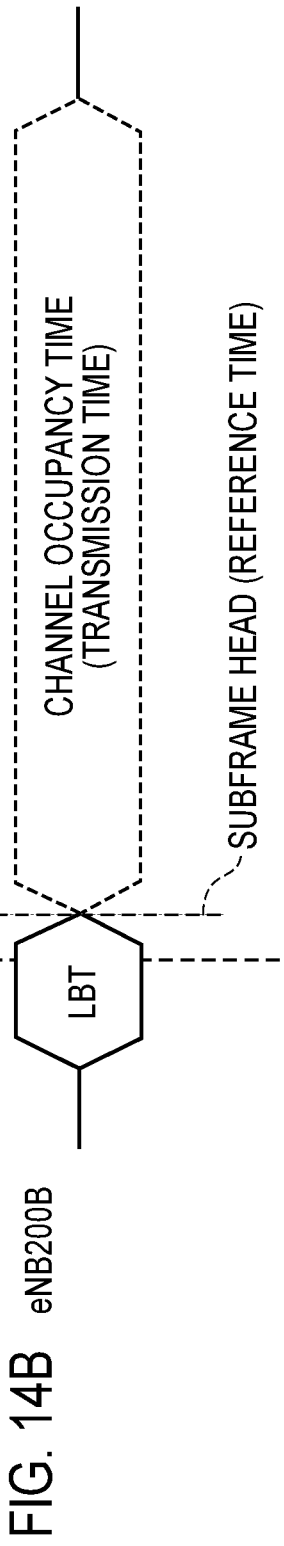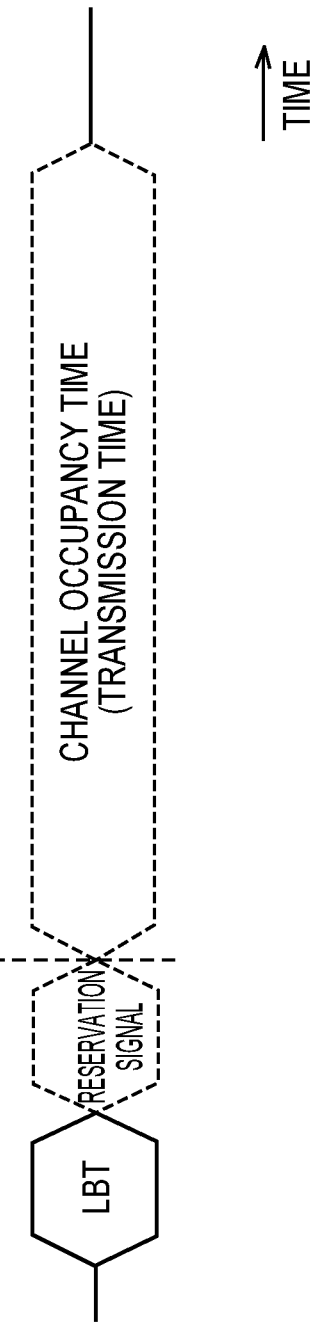

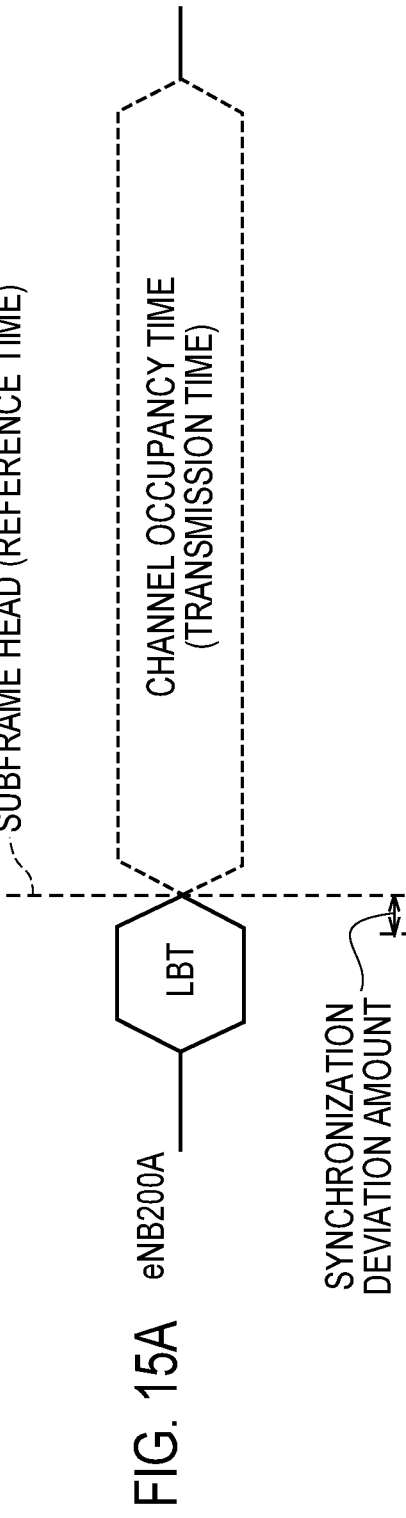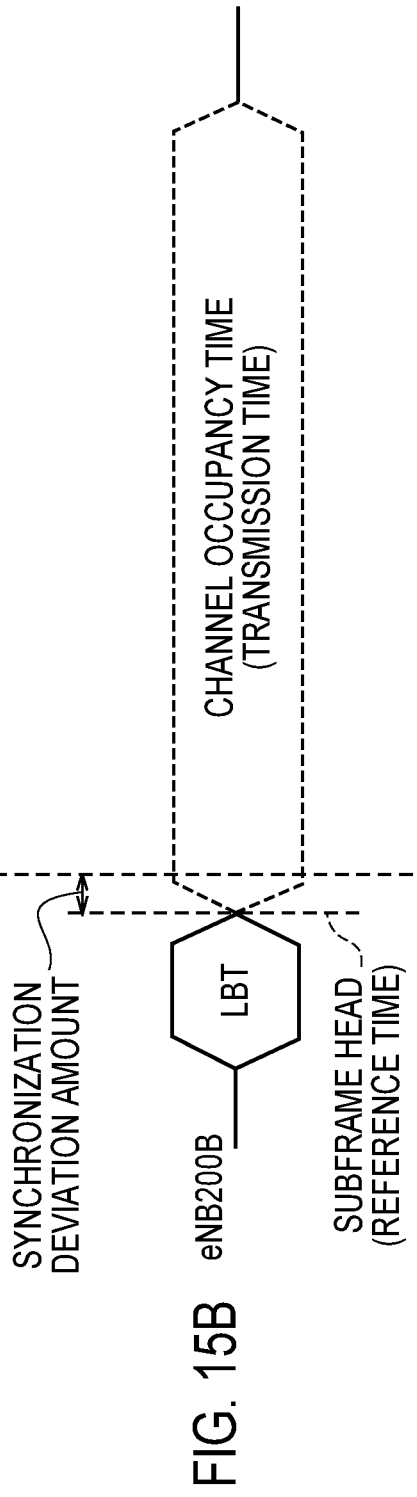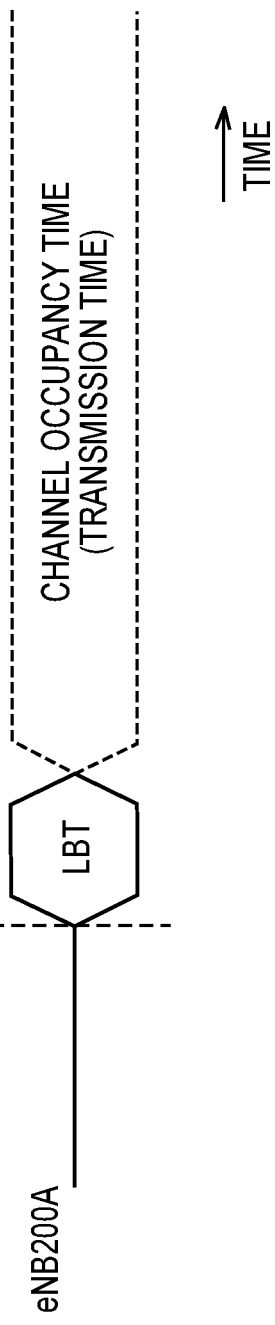

USER TERMINAL AND BASE STATION

CROSS REFERENCE

This application is a continuation application of international application PCT/JP2016/051965, filed Jan. 25, 2016, which claims the benefit of U.S. Provisional Application No. 62/110,116 filed Jan. 30, 2015, U.S. provisional application No. 62/134,197 filed Mar. 17, 2015, U.S. provisional application No. 62/145,851 filed Apr. 10, 2015, and U.S. Provisional Application No. 62/203,575, filed Aug. 11, 2015, the entire contents of which are incorporated herein by reference.

TECHNICAL FIELD

The present disclosure relates to a user terminal and a base station which are used in a mobile communication system.

BACKGROUND ART

In 3rd Generation Partnership Project (3GPP) which is a mobile communication system standardization project, attempts to enhance Long Term Evolution (LTE) in order to satisfy rapidly increasing traffic demands have been made.

As one of such attempts, in addition to a frequency band which is licensed to an operator (licensed band), the use of a frequency band which need not be licensed (unlicensed band) for LTE communication is under review (Non Patent Literature 1).

In the unlicensed band, a listen-before-talk (LBT) procedure is required to prevent interference with a system different from an LTE system (a wireless LAN or the like) or LTE systems of other operators. In the LBT procedure, a base station checks whether or not a frequency channel (carrier) is free on the basis of reception power and uses the frequency channel only when it is checked that it is a free channel (clear channel).

CITATION LIST

Non Patent Literature

Non Patent Literature 1: 3GPP Technical report "TR36.889 V0.1.1" November, 2014

SUMMARY

A user terminal according to a first feature is used in a mobile communication system. The use terminal includes: a receiver configured to receive a measurement instruction to instruct measurement in an unlicensed band, from a base station; a controller configured to, in response to reception of the measurement instruction, search for a radio signal transmitted in a frequency channel included in the unlicensed band, and measure reception power of the radio signal detected by the search, even when a cell identifier of a measurement target cell is not designated in the measurement instruction; and a transmitter configured to transmit a measurement report including an identifier of a transmission source of the detected radio signal and a measurement result of the reception power, to the base station.

A base station according to a second feature is used in mobile communication system. The base station includes: a transmitter configured to transmit a measurement instruction to instruct measurement in an unlicensed band, to a user terminal; a receiver configured to receive a measurement report from the user terminal; and a controller configured to determine, based on the measurement report, whether or not the base station uses a frequency channel included in the unlicensed band. The measurement report includes an identifier of a transmission source of a radio signal detected by the user terminal in the frequency channel and a measurement result of reception power of the radio signal.

A base station according to a third feature is used in a mobile communication system. The base station includes: a controller configured to search for a radio signal transmitted in a frequency channel included in an unlicensed band, and to measure reception power of the radio signal detected by the search; and a transmitter configured to wirelessly transmit a beacon signal which is based on a measurement result of the reception power. The beacon signal is referred by another base station that has received the beacon signal to determine whether or not the frequency channel is used.

A base station according to a fourth feature is used in a mobile communication system. The base station includes: a receiver configured to wirelessly receive, from another base station, a beacon signal which is based on a measurement result of reception power of a radio signal transmitted in a frequency channel included in an unlicensed band; and a controller configured to determine, based on the beacon signal, whether or not the base station uses the frequency channel.

A communication apparatus includes a controller configured to: observe, before the communication apparatus transmits a radio signal in a channel of an unlicensed band, a use state of the channel in an observation period having a predetermined time length; and check whether or not the channel is a free channel. The controller is further configured to: detect a synchronization deviation amount with another communication apparatus on the basis of a radio signal transmitted from the another communication apparatus; and change a start timing of the observation period in accordance with the synchronization deviation amount.

A base station according to a sixth feature includes: a controller configured to perform a process of transmitting transmission data through a physical downlink shared channel (PDSCH). The controller is configured to perform a process of transmitting predetermined data as a reservation signal for reserving a channel, before transmitting the transmission data. The predetermined data includes at least a part of the transmission data.

A user terminal according to a seventh feature includes: a controller configured to perform: a process of receiving, from a base station, predetermined data carried through a reservation signal, and transmission data carried through a Physical Downlink Shared Channel (PDSCH) arranged after the predetermined data; and a predetermined decoding process. The predetermined data includes at least a part of the transmission data. The predetermined decoding process includes a process of combining the predetermined data as redundant data of the transmission data.

A user terminal according to an eighth feature includes: a controller configured to perform: a radio resource management (RRM) measurement process; and a report process of reporting, to a base station, a measurement result for a plurality of cells together with an operator ID. The measurement result includes a reference signal received power (RSRP) and/or a reference signal received quality (RSRQ), and a received signal strength indicator (RSSI).

A base station according to a ninth feature includes: a controller configured to check the presence or absence of a free channel before the base station transmits an initial signal in an unlicensed band. The controller is configured to transmit a reservation signal until a symbol capable of being used for starting transmission of the initial signal starts, after completion of the checking. The reservation signal is used as a cyclic prefix.

BRIEF DESCRIPTION OF DRAWINGS

FIGS. 14A to 14C are diagrams illustrating a first operation example of an eNB according to the third embodiment.

FIGS. 15A to 15C are diagrams illustrating a second operation example of an eNB according to the third embodiment.

DESCRIPTION OF EMBODIMENTS

First Embodiment

Overview of First Embodiment

Figure 1:
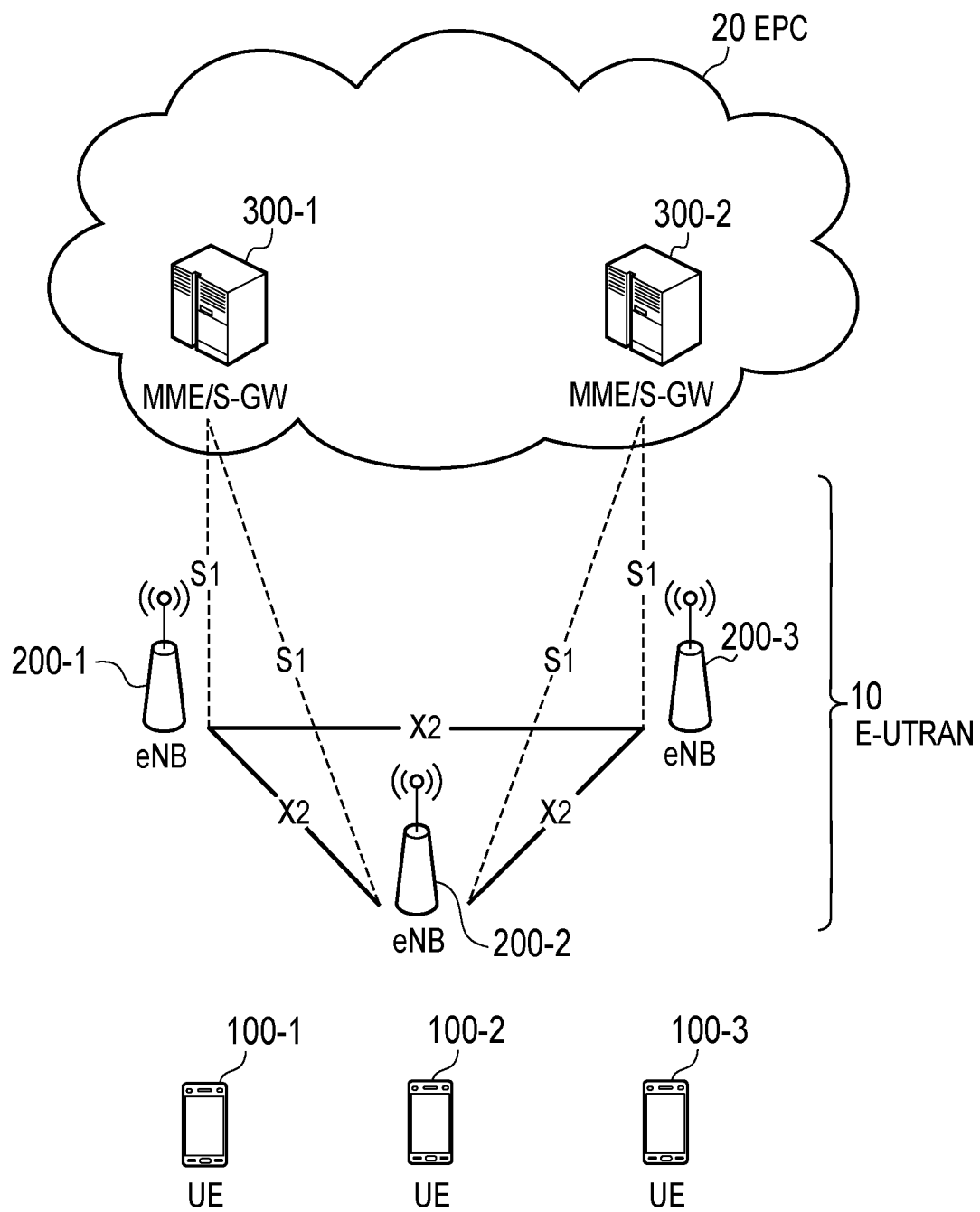
FIG. 1 is a configuration diagram of an LTE system according to first and second embodiments.

The LBT procedure is based on power detection (energy detection) in the base station. However, it is difficult for the base station to prevent interference in the unlicensed band on the basis of information obtained by the power detection by the base station.

Therefore, in first and second embodiments, a user terminal and a base station which are capable of facilitating interference prevention in the unlicensed band are provided.

A user terminal according to a first embodiment is used in a mobile communication system. The user terminal includes: a receiver configured to receive a measurement instruction to instruct measurement in an unlicensed band, from a base station; a controller configured to, in response to reception of the measurement instruction, search for a radio signal transmitted in a frequency channel included in the unlicensed band, and measure reception power of the radio signal detected by the search, even when a cell identifier of a measurement target cell is not designated in the measurement instruction; and a transmitter configured to transmit a measurement report including an identifier of a transmission source of the detected radio signal and a measurement result of the reception power, to the base station.

In the first embodiment, the measurement instruction includes information designating a frequency channel of a measurement target in the unlicensed band. The controller is configured to search for a radio signal transmitted in the frequency channel designated by the measurement instruction.

In the first embodiment, the controller is configured to search for the radio signal transmitted from a cell of the mobile communication system in the unlicensed band, and measure the reception power of the radio signal detected by the search. The transmitter is configured to transmit the measurement report including a cell identifier of a transmission source cell of the detected radio signal and the measurement result of the reception power.

In the first embodiment, the controller is configured to search for the radio signal transmitted from a cell belonging to an operator different from an operator to which the base station belongs, and measure the reception power of the radio signal detected by the search.

In the first embodiment, the cell identifier includes operator information indicating an operator to which the transmission source cell belongs.

In the first embodiment, the radio signal is a synchronization signal, a reference signal, or a beacon signal.

In the first embodiment, the controller is configured to search for the radio signal transmitted from an apparatus of a system different from the mobile communication system, and measure the reception power of the radio signal detected by the search.

A base station according to the first embodiment is used in a mobile communication system. The base station includes: a transmitter configured to transmit a measurement instruction to instruct measurement in an unlicensed band, to a user terminal; a receiver configured to receive a measurement report from the user terminal; and a controller configured to determine, based on the measurement report, whether or not the base station uses a frequency channel included in the unlicensed band. The measurement report includes an identifier of a transmission source of a radio signal detected by the user terminal in the frequency channel and a measurement result of reception power of the radio signal.

In the first embodiment, when the number of identifiers of the transmission sources is a predetermined number or more, and/or the measurement result is a threshold value or more, the controller is configured to determine that the base station does not use the frequency channel.

In the first embodiment, the identifier of the transmission source includes a cell identifier of a cell operated by the base station in the unlicensed band and an identifier of a transmission source other than the cell. When the measurement result corresponding to the identifier of the transmission source other than the cell is larger than the measurement result corresponding to the cell identifier of the cell, the controller is configured to determine that the base station does not use the frequency channel.

In the first embodiment, the measurement instruction includes information designating a target frequency channel to be measured in the unlicensed band.

In the first embodiment, the identifier of the transmission source is a cell identifier. The cell identifier includes operator information indicating an operator to which the transmission source cell belongs.

Hereinafter, embodiments in which the present disclosure is applied to the LTE system will be described.

(Overview of LTE System)

First, a system configuration of an LTE system will be described. FIG. 1 is a diagram illustrating a configuration of the LTE system.

The LTE system includes user equipment (UE) 100, an evolved-UMTS terrestrial radio access network (E-UTRAN) 10, and an evolved packet core (EPC) 20 as illustrated in FIG. 1.

The UE 100 corresponds to user terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function (hereinafter referred to simply as "data"), a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs data transfer control. The MME/S-GW 300 is connected to the eNB 200 via an S1 interface. The E-UTRAN 10 and the EPC 20 constitute a network.

Figure 2:
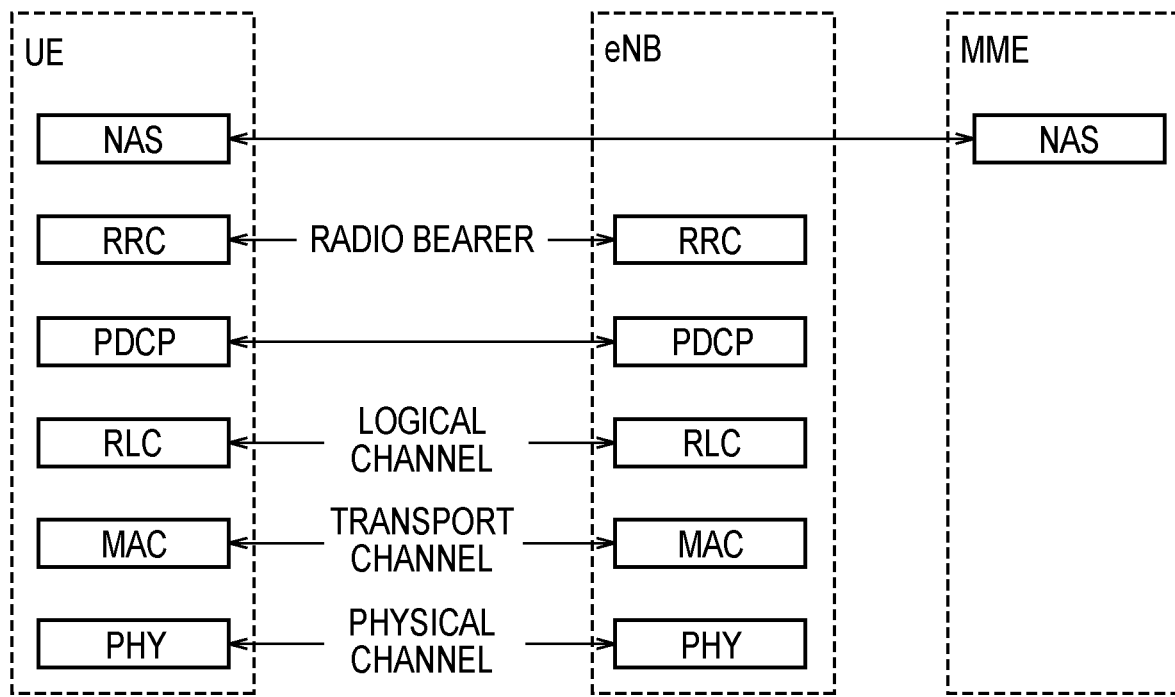
FIG. 2 is a protocol stack diagram of a radio interface according to the first and second embodiments.

FIG. 2 is a protocol stack diagram of a radio interface in the LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. Data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. Data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. Data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A message (RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. When there is a connection (RRC connection) between the RRC of the UE 100 and the RRC of the eNB 200, the UE 100 is in an RRC connected state, and otherwise, the UE 100 is in an RRC idle state.

A non-access stratum (NAS) layer located above the RRC layer performs session management, mobility management, and the like.

Figure 3:
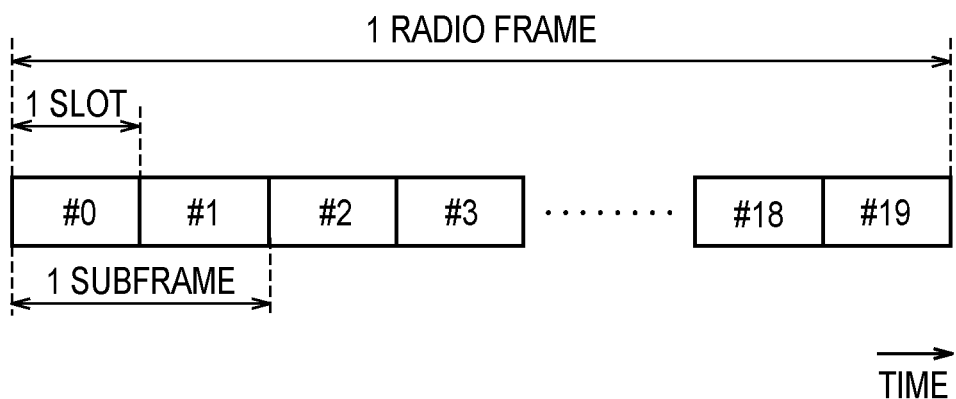
FIG. 3 is a configuration diagram of a radio frame according to the first and second embodiments.

FIG. 3 is a configuration diagram of a radio frame used in the LTE system. In the LTE system, orthogonal frequency division multiple access (OFDMA) is applied to downlink, and Single Carrier Frequency Division Multiple Access (SC-FDMA) is applied to uplink.

As illustrated in FIG. 3, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One symbol and one subcarrier constitute one resource element (RE). Among the radio resources (time/frequency resources) allocated to the UE 100, frequency resources can be specified by resource blocks, and time resources can be specified by subframes (or slots).

In the downlink, an interval of first few symbols of each subframe is a region used mainly as a physical downlink control channel (PDCCH) for transmitting a downlink control signal. The PDCCH will be described later in detail. The remaining parts of each subframe are a region that can be mainly used as a physical downlink shared channel (PDSCH) for transmitting downlink data. A downlink reference signal such as a cell specific reference signal (CRS) is arranged in each subframe.

In the uplink, both end portions of each subframe in the frequency direction are regions used mainly as a physical uplink control channel (PUCCH) for transmitting an uplink control signal. The remaining parts of each subframe are a region that can be used mainly as a physical uplink shared channel (PUSCH) for transmitting uplink data. An uplink reference signal such as a sounding reference signal (SRS) is arranged in each subframe.

(Configuration of UE 100)

Figure 4:
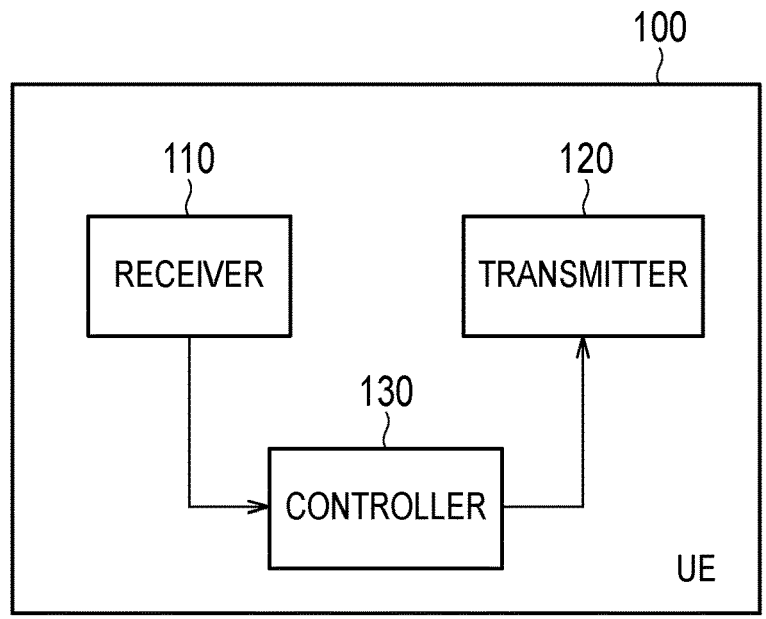
FIG. 4 is a block diagram of a UE according to the first and second embodiments.

A configuration of the UE 100 (user terminal) will be described below. FIG. 4 is a block diagram illustrating a configuration of the UE 100. The UE 100 includes a receiver 110, a transmitter 120, and a controller 130 as illustrated in FIG. 4.

The receiver 110 performs various kinds of receptions under the control of the controller 130. The receiver 110 includes an antenna and a receiving device. The receiving device converts a radio signal received through the antenna into a baseband signal (reception signal) and outputs the baseband signal to the controller 130. The receiver 110 may include a first receiving device that receives a radio signal in the licensed band and a second receiving device that receives a radio signal in the unlicensed band.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal from the antenna. The transmitter 120 may include a first transmitting device that transmits a radio signal in the licensed band and a second transmitting device that transmits a radio signal in the unlicensed band.

The controller 130 controls various kinds of control in the UE 100. The controller 130 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor may include a codec that encodes and decodes audio/video signals. The processor executes various kinds of processes to be described later and various kinds of communication protocols described above.

The UE 100 may include a user interface and a battery. The user interface is an interface with the user who owns the UE 100, and includes, for example, a display, a microphone, a speaker, various kinds of buttons, or the like. The user interface receives an operation from the user and outputs a signal indicating content of the operation to the controller 130. The battery stores electric power to be supplied to the blocks of the UE 100.

(Configuration of eNB 200)

Figure 5:
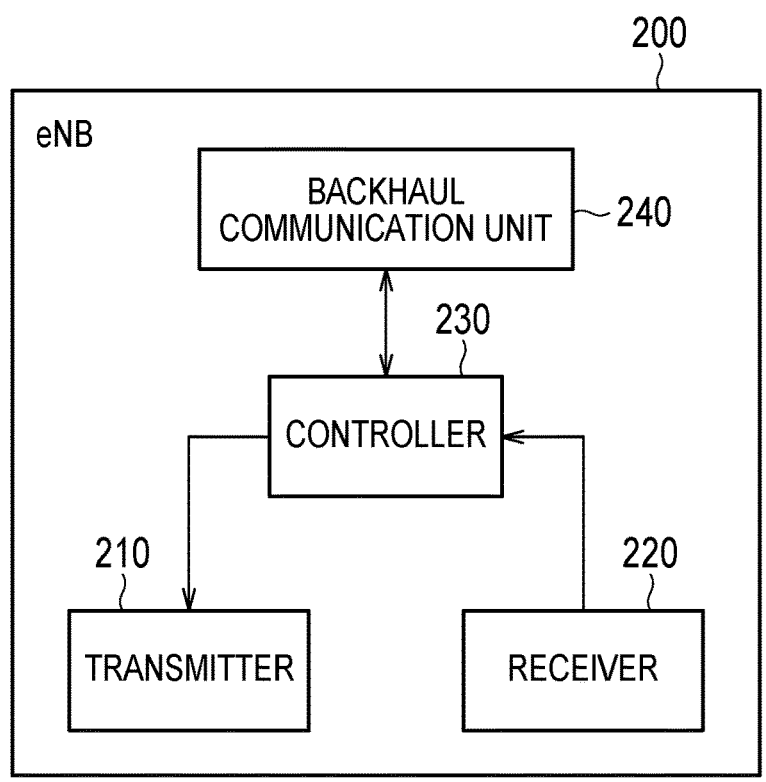
FIG. 5 is a block diagram of an eNB according to the first and second embodiments.

Next, a configuration of the eNB 200 (base station) will be described. FIG. 5 is a block diagram of the eNB 200. The eNB 200 includes a transmitter 210, a receiver 220, a controller 230, and a backhaul communication unit 240 as illustrated in FIG. 5.

The transmitter 210 transmits various kinds of transmissions under the control of the controller 230. The transmitter 210 includes an antenna and a transmitting device. The transmitting device converts a baseband signal (a transmission signal) output from the controller 130 into a radio signal and transmits the radio signal from the antenna. The transmitter 210 may include a first transmitting device that transmits a radio signal in the licensed band and a second transmitting device that transmits a radio signal in the unlicensed band.

The receiver 220 receives various kinds of receptions under the control of the controller 230. The receiver 220 includes an antenna and a receiving device. The receiving device converts a radio signal received by the antenna into a baseband signal (reception signal) and outputs the baseband signal to the controller 230. The receiver 220 may include a first receiving device that receives a radio signal in the licensed band and a second receiving device that receives a radio signal in the unlicensed band.

The controller 230 controls various kinds of controls in the eNB 200. The controller 230 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor executes various kinds of processes to be described later and various kinds of communication protocols described above.

The backhaul communication unit 240 is connected to the neighbor eNB 200 via the X2 interface and connected to the MME/S-GW 300 via the S1 interface. The backhaul communication unit 240 is used for communication performed via the X2 interface, communication to be performed via the S1 interface, and the like.

(LAA)

In the LTE system according to the first embodiment, in addition to the licensed band licensed to the operator, the unlicensed band which need not be licensed is used for LTE communication. Specifically, it is possible to access the unlicensed band with the assistance of the licensed band. This mechanism is referred to as "licensed-assisted access (LAA)."

Figure 6:
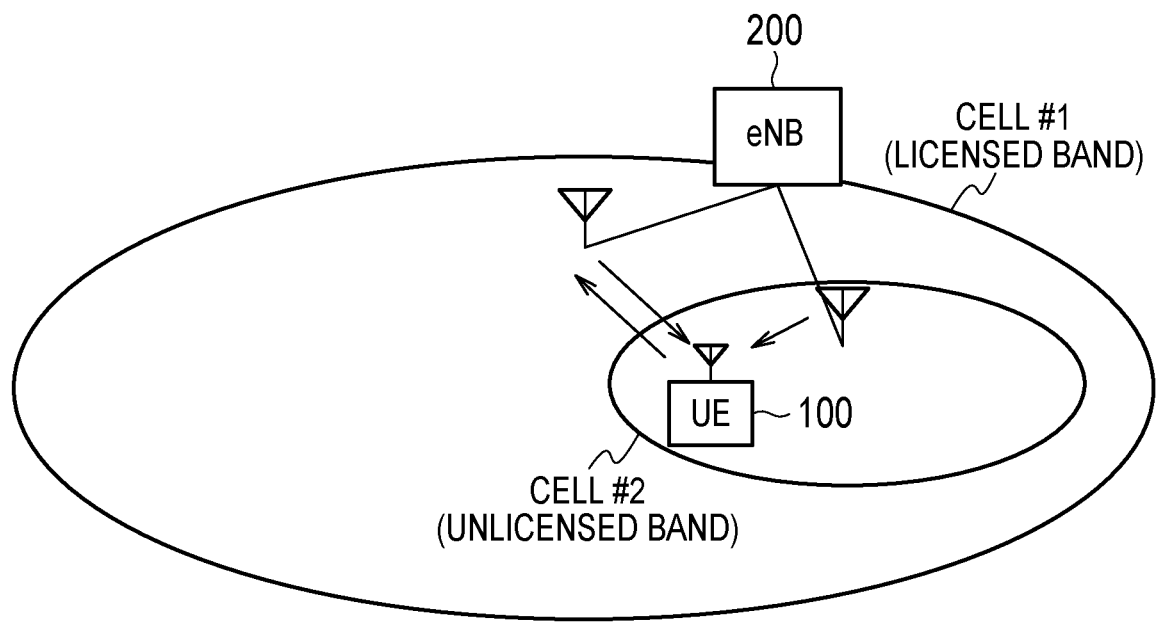
FIG. 6 is a diagram for describing LAA according to the first and second embodiments.

FIG. 6 is a diagram for describing the LAA. As illustrated in FIG. 6, the eNB 200 manages a cell #1 operated in the licensed band and a cell #2 operated in the unlicensed band. FIG. 6 illustrates an example in which the cell #1 is a macro cell, and the cell #2 is a small cell, but the cell size is not limited thereto.

The UE 100 is located in an overlapping area of the cell #1 and the cell #2. The UE 100 sets the cell #1 as a primary cell (PCell) while setting the cell #2 as a secondary cell (SCell), and performs communication based on carrier aggregation (CA).

In the example of FIG. 6, the UE 100 performs uplink communication and downlink communication with the cell #1 and downlink communication with the cell #2. Through the carrier aggregation, radio resources of the unlicensed band are provided to the UE 100 in addition to radio resources of the licensed band, and thus the downlink throughput can be improved. The UE 100 may further perform uplink communication with the cell #2.

In the unlicensed band, the listen-before-talk (LBT) procedure is required to prevent interference with a system different from the LTE system (a wireless LAN or the like) or LTE systems of other operators. The LBT procedure is a procedure of checking whether or not a frequency channel (carrier) is free on the basis of reception power and using the frequency channel only when it is checked that it is a free channel (clear channel).

The eNB 200 searches for a free channel in the cell #2 (the unlicensed band) through the LBT procedure and allocates (schedules) the radio resources included in the free channel to the UE 100. The eNB 200 performs the scheduling in the cell #2 via the cell #2. Alternatively, the eNB 200 may perform the scheduling in the cell #2 via the cell #1 (that is, cross-carrier scheduling).

(Operation According to First Embodiment)

The LBT procedure is based on power detection (energy detection) in the eNB 200. However, it is difficult for the eNB 200 to prevent interference in the unlicensed band on the basis on only the information obtained by the power detection by the eNB 200.

Firstly, the reason is that the radio signal detected by the UE 100 is not necessarily detected by the eNB 200. In other words, there may be an interference source which is not detectable by the eNB 200 but detectable by the UE 100. For this reason, when the frequency channel which is determined to be a free channel by the eNB 200 is used, the UE 100 may be affected by the interference from the interference source.

Secondly, it is relatively easy to prevent the interference when the eNB 200 obtains information related to the interference source in advance, but when the interference source is an eNB of another operator, it is difficult to obtain information related to the interference source from other operators.

Figure 7:
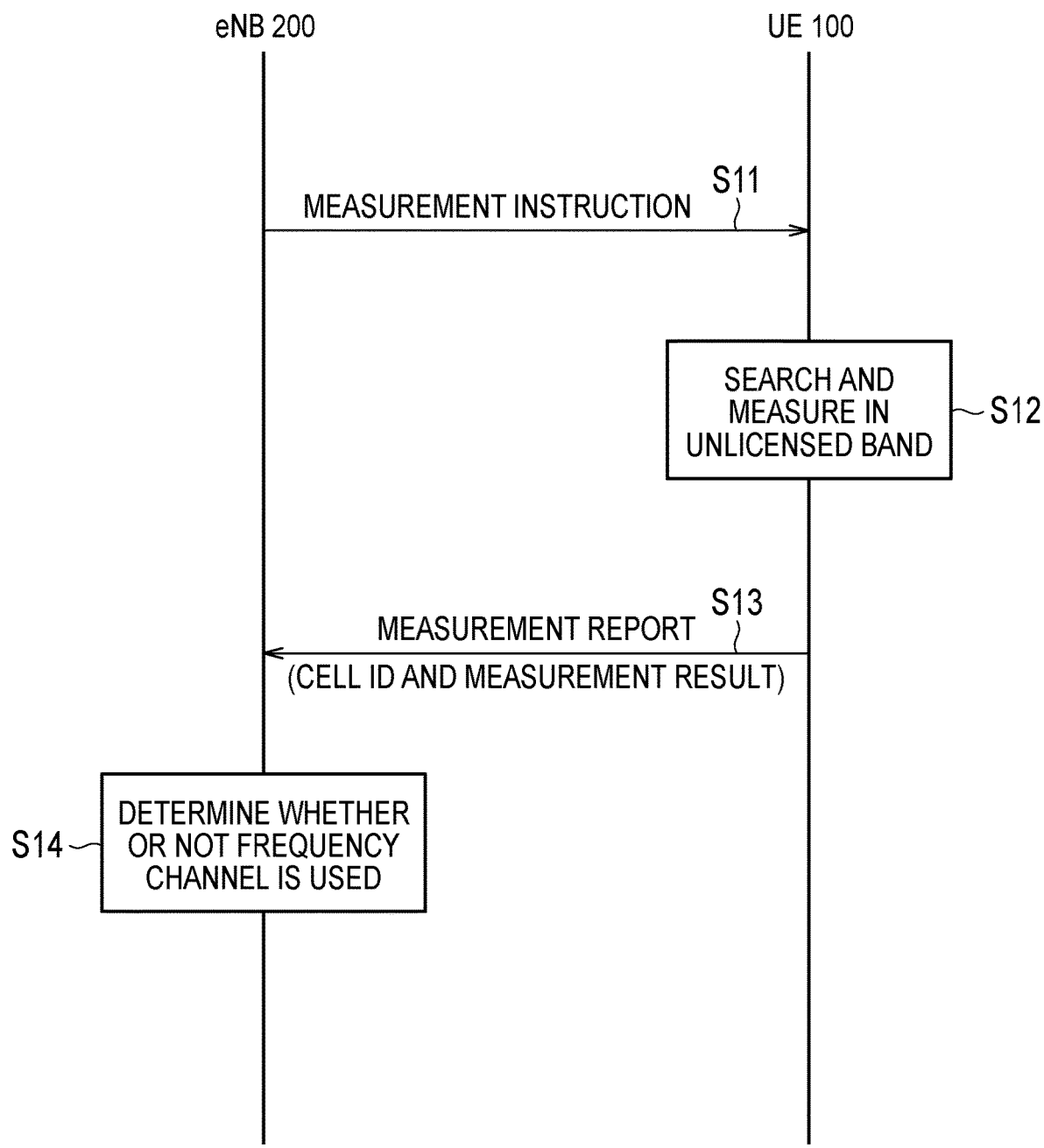
FIG. 7 is a diagram illustrating an operation according to the first embodiment.

Next, an operation of facilitating interference prevention in the unlicensed band according to the first embodiment will be described. FIG. 7 is a diagram illustrating an operation according to the first embodiment. In an initial state of FIG. 7, the UE 100 has not started the LAA (carrier aggregation). In this case, the UE 100 may be in the RRC connected state or may be in the RRC idle state. Alternatively, the UE 100 is in a state in which the LAA is being executed. In this case, the UE 100 is in the RRC connected state.

As illustrated in FIG. 7, in step S11, the transmitter 210 of the eNB 200 transmits a measurement instruction to instruct measurement in the unlicensed band to the UE 100.

When the LAA has not been started, the transmitter 210 of the eNB 200 transmits the measurement instruction to the UE 100 via the cell #1 (the licensed band). When the LAA is being executed, the transmitter 210 of the eNB 200 transmits the measurement instruction to the UE 100 via either the cell #1 (the licensed band) or the cell #2 (the unlicensed band). The measurement instruction may be an individual message (for example, an individual RRC message) or a broadcast message (for example, a broadcast RRC message).

The measurement instruction preferably includes information designating the frequency channel of the measurement target in the unlicensed band. For example, a candidate frequency channel to be used for the LAA or the frequency channel being used for the LAA is designated as the measurement target.

Here, the measurement instruction may not include information designating a cell identifier of a measurement target cell. It is because in the unlicensed band, as an eNB of another operator or an apparatus of another system (for example, a wireless LAN access point) may be the interference source, and thus it is insufficient to measure only for a specific cell.

The receiver 110 of the UE 100 receives the measurement instruction to instruct the measurement in the unlicensed band from the eNB 200.

In step S12, upon receiving the measurement instruction, the controller 130 of the UE 100 searches for a radio signal transmitted in a frequency channel included in the unlicensed band, and measures the reception power of the radio signal detected by the search. When the frequency channel is designated by the measurement instruction, the controller 130 of the UE 100 searches for a radio signal transmitted in the designated frequency channel. When the frequency channel is not designated by the measurement instruction, the controller 130 of the UE 100 may search for the radio signal transmitted in each of frequency channels included in the unlicensed band.

The controller 130 of the UE 100 searches for a radio signal transmitted from the cell of the LTE system in the unlicensed band and measures the reception power of the radio signal detected by the search. In this case, the radio signal is a synchronization signal, a reference signal, or an LTE beacon signal. The synchronization signal is, for example, a primary synchronization signal (PSS) and/or a secondary synchronization signal (SSS). The reference signal is, for example, a discovery reference signal (DRS).

The controller 130 of the UE 100 can specify the cell identifier of the transmission source on the basis of the received synchronization signal and/or the received reference signal. It is desirable that the cell identifier includes operator information indicating the operator to which the transmission source cell belongs. For example, a part of the cell identifier is used as the operator identifier. The LTE beacon signal will be described in the second embodiment.

Further, it is desirable that the controller 130 of the UE 100 search for a radio signal transmitted from a cell belonging to an operator different from the operator to which the eNB 200 belongs, and measures the reception power of the radio signal detected by the search. As described above, the eNBs of other operators can be interference sources.

Further, the controller 130 of the UE 100 may search for a radio signal transmitted from an apparatus of a system different from the LTE system (for example, a wireless LAN access point), and measure the reception power of the radio signal detected by the search. As described above, the apparatuses of other systems can be an interference source. In this case, the radio signal is, for example, a wireless LAN beacon signal.

In step S13, the transmitter 120 of the UE 100 transmits a measurement report including the identifier (cell identifier) of the transmission source of the detected radio signal and the measurement result of the reception power to the eNB 200. When radio signals of a plurality of cells are detected, the measurement report includes the cell identifier of each cell and the measurement result associated with each cell identifier. It is desirable that the measurement report further include information indicating the frequency channel on which the UE 100 has measured for each cell identifier. When a radio signal of an apparatus of another system is detected, the measurement report preferably further includes an identifier of the apparatus of another system.

When the LAA has not been started, the transmitter 120 of the UE 100 transmits the measurement report to the cell #1 (the licensed band). When the LAA is being executed, the transmitter 120 of the UE 100 transmits the measurement report to either the cell #1 (the licensed band) or the cell #2 (the unlicensed band). The measurement report is, for example, an individual RRC message.

The receiver 220 of the eNB 200 receives the measurement report from the UE 100.

In step S14, the controller 230 of the eNB 200 determines whether or not the frequency channel included in the unlicensed band is used in its own eNB 200 (the cell #2) on the basis of the measurement report. In other words, the controller 230 of the eNB 200 selects available frequency channels in the unlicensed band.

The controller 230 of the eNB 200 determines that the frequency channel is not used in its own eNB 200 when the number of identifiers of the transmission source is a predetermined number or more and/or the measurement result is a threshold value or more. In other words, when many cells and/or apparatuses use the frequency channel, the frequency channel is not used. Alternatively, the frequency channel in which there is a strong interference source in the frequency channel is not used.

Alternatively, when the measurement result corresponding to the identifier of the transmission source (other cells or access points) other than its own cell is larger than the measurement result corresponding to the cell identifier of its own cell (the cell #2), the controller 230 of the eNB 200 determines that the frequency channel is not used in its own eNB 200. This determination is particularly effective while the LAA is being executed.

The controller 230 of the eNB 200 may use the channel selection based on the measurement report and the channel selection based on the power detection (energy detection) in its own eNB.

Further, when the cell identifier includes the operator information, the controller 230 of the eNB 200 may determine whether or not a negotiation for interference prevention is performed on the basis of the operator information. When it is the same operator, since it is possible to perform communication via a backhaul, access to another eNB that manages another cell corresponding to the cell identifier may be performed, and the negotiation may be performed.

Further, although detailed description will be described in the second embodiment, the LTE beacon signal can be a communication means for the eNB 200 belonging to a different operator. Therefore, for eNB 200 belonging to another operator, interference suppression may be requested by the LTE beacon signal instead of the negotiation via the backhaul. For example, a request of decreasing the transmission power or a request of restricting a resource allocation is made by the LTE beacon signal. At that time, an identifier (cell identifier) of a destination eNB may also be included, and a destination eNB may be designated, and a request may be made. Upon receiving the LTE beacon signal, the destination eNB may further give a response (for example, a positive response or a negative response) through the LTE beacon signal.

Modified Example of First Embodiment

When the LBT procedure is applied to the UE 100, the controller 130 of the UE 100 periodically measures the reception power and evaluates whether or not the measurement result of the reception power satisfies a criterion (is lower than a threshold value). At that time, the controller 130 of the UE 100 counts the number of measurements (the number of evaluations) until the measurement result of the reception power satisfies the criterion and include the count value (that is, the number of failures until the LBT is successfully performed) in the measurement report. The count value indicates a congestion degree of a corresponding frequency channel and can be regarded as "congestion degree information."

When the radio signals of both LTE and another system are detected, the controller 130 of the UE 100 may measure the reception power of LTE and the reception power of another system, obtain a power ratio of the reception power of LTE and the reception power of another system, and include the power ratio in the measurement report. Here, another system may be the wireless LAN, and the power ratio of the reception power of LTE and the reception power of the wireless LAN may be included in the measurement report. The power ratio is information indicating a cause of the congestion degree and can be regarded as "congestion factor information."

The details will be described in the second embodiment, but the LTE beacon signal may include the congestion degree information and/or the congestion factor information obtained by the eNB 200. Therefore, the UE 100 connected to one eNB 200 may acquire the congestion degree information and/or the congestion factor information included in the LTE beacon signal received from another eNB 200, include the acquired congestion degree information and/or the congestion factor information in the measurement report, and transmit the measurement report to the one eNB 200.

Second Embodiment

Overview of Second Embodiment

A base station according to the second embodiment is used in a mobile communication system. The base station includes: a controller configured to search for a radio signal transmitted in a frequency channel included in an unlicensed band, and measure reception power of the radio signal detected by the search; and a transmitter configured to wirelessly transmit a beacon signal which is based on a measurement result of the reception power. The beacon signal is referred by another base station that has received the beacon signal to determine whether or not the frequency channel is used.

In the second embodiment, the another base station is a base station belonging to an operator different from an operator to which the base station belongs.

In the second embodiment, the beacon signal includes information indicating the frequency channel and the measurement result of the reception power.

In the second embodiment, the controller calculates a power ratio from reception power measured for each of the mobile communication system and another system, and includes the power ratio into the beacon signal.

In the second embodiment, the controller is configured to calculate the number of power measurements or a power measurement period, which is required until the measurement result of the reception power satisfies a predetermined criterion, and include a value obtained by the calculation, into the beacon signal.

In a second modified example of the second embodiment, the base station further includes a receiver configured to receive the measurement report from the user terminal. The measurement report includes an identifier of a transmission source of a radio signal detected by the user terminal in the frequency channel and a measurement result of the reception power of the radio signal. The beacon signal is further based on the measurement report.

A base station according to the second embodiment is used in a mobile communication system. The base station includes: a receiver configured to wirelessly receive, from another base station, a beacon signal which is based on a measurement result of reception power of a radio signal transmitted in a frequency channel included in an unlicensed band; and a controller configured to determine, based on the beacon signal, whether or not the base station uses the frequency channel.

The second embodiment will be described focusing on a difference with the first embodiment.

In the second embodiment, the eNB 200 shares a power detection (energy detection) result in its own eNB with other eNBs. Alternatively, the eNB 200 may transmit a request for interference prevention to the other eNBs on the basis of the power detection result in its own eNB.

(Operating Environment Related to Second Embodiment)

Figure 8:
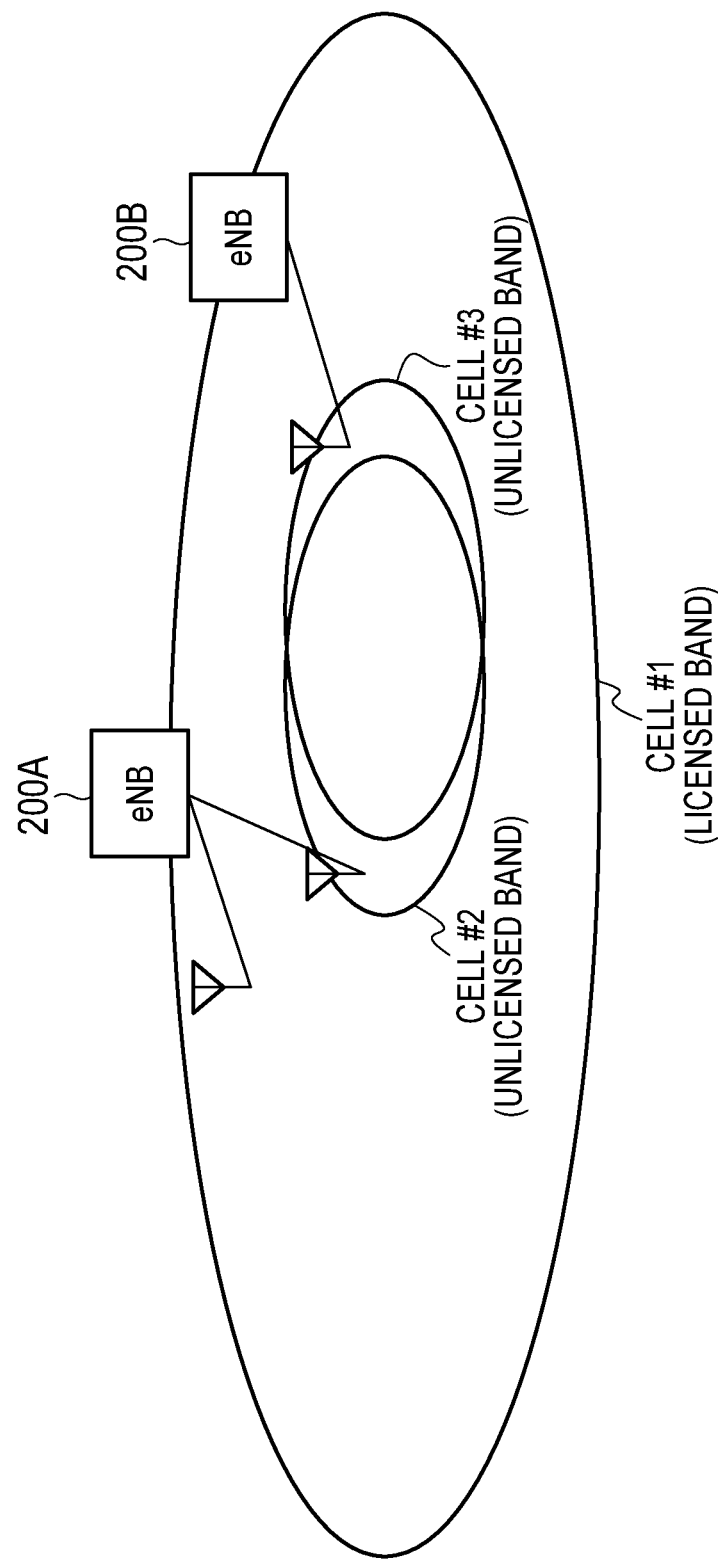
FIG. 8 is a diagram illustrating an operating environment according to the second embodiment.

FIG. 8 is a diagram illustrating an operating environment according to the second embodiment. As illustrated in FIG. 8, an eNB 200A manages a cell #1 operated in the licensed band and a cell #2 operated in the unlicensed band. An eNB 200B manages a cell #3 operated in the unlicensed band. The eNB 200B may further manage a cell operated in the licensed band. The cell #2 and the cell #3 overlap at least partially. In FIG. 8, the cell #1 is a macro cell, and the cells #2 and #3 are small cells, but the cell size is not limited thereto. The eNB 200A and the eNB 200B belong to different operators. For this reason, it is difficult for the eNB 200A and the eNB 200B to perform communication with each other via the backhaul.

(Operation Related to Second Embodiment)

Figure 9:
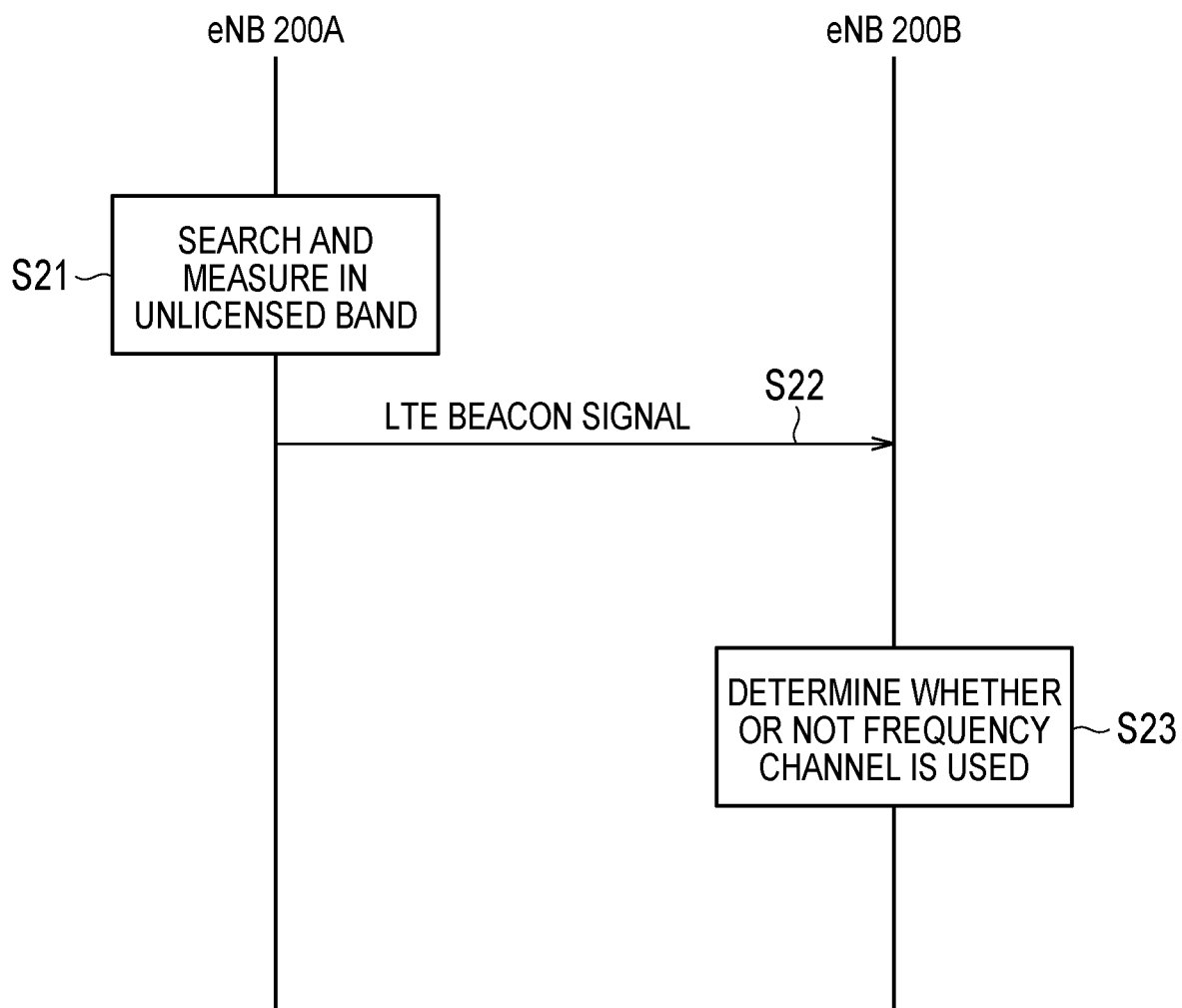
FIG. 9 is a diagram illustrating an operation according to the second embodiment.

An operation of facilitating the interference prevention in the unlicensed band according to the second embodiment will be described below. FIG. 9 is a diagram illustrating an operation according to the second embodiment.

As illustrated in FIG. 9, in step S21, the controller 230 of the eNB 200A searches for a radio signal transmitted in the frequency channel included in the unlicensed band, and measures the reception power of the radio signal detected by the search. The controller 230 of the eNB 200A searches for a radio signal transmitted in a specific frequency channel. Alternatively, the controller 230 of the eNB 200A may search for a radio signal transmitted in each of frequency channels included in the unlicensed band.

The controller 230 of the eNB 200A searches for a radio signal transmitted from a cell of the LTE system in the unlicensed band and measures the reception power of the radio signal detected by the search. In this case, the radio signal is a synchronization signal or a reference signal. The synchronization signal is, for example, a primary synchronization signal (PSS) and/or a secondary synchronization signal (SSS). The reference signal is, for example, a discovery reference signal (DRS).

The controller 230 of the eNB 200A can specify a cell identifier of the transmission source on the basis of the received synchronization signal and/or the received reference signal. It is desirable that the cell identifier include operator information indicating an operator to which the transmission source cell belongs. For example, a part of the cell identifier is used as the operator identifier.

Further, it is desirable that the controller 230 of the eNB 200A search for a radio signal transmitted from a cell belonging to an operator different from the operator to which the eNB 200A belongs, and measures the reception power of the radio signal detected by the search. As described above, eNBs of other operators can be interference sources.

Further, the controller 230 of the eNB 200A may search for a radio signal transmitted from an apparatus of a system different from the LTE system (for example, a wireless LAN access point), and measure the reception power of the radio signal detected by the search. As described above, the apparatuses of other systems can be an interference source. In this case, the radio signal is, for example, a wireless LAN beacon signal.

In step S22, the transmitter 210 of the eNB 200A wirelessly transmits the LTE beacon signal based on the measurement result of the reception power in step S21. The LTE beacon signal is transmitted in the unlicensed band (the cell #2). The LTE beacon signal includes information indicating the frequency channel and the measurement result of the reception power. When a plurality of frequency channels are measured, the LTE beacon signal includes the measurement results of the reception power of the frequency channels.

Further, the controller 230 of the eNB 200A may periodically measure the reception power through the LBT procedure and evaluate whether or not the measurement result of the reception power satisfies a criterion (is lower than a threshold value). At that time, the controller 230 of the eNB 200A may calculate the number of measurements (the number of evaluations) or the measurement period (evaluation period) until the measurement result of the reception power satisfies the criterion and then include the value in the beacon signal. The value indicates a congestion degree of a corresponding frequency channel and can be regarded as "congestion degree information."

Further, when the radio signals of both LTE and another system are detected, the controller 230 of the eNB 200A may measure the reception power of LTE and the reception power of another system, obtain a power ratio of the reception power of LTE and the reception power of another system, and include the power ratio in the beacon signal. Here, another system may be the wireless LAN, and the power ratio of the reception power of LTE and the reception power of the wireless LAN may be included in the measurement report. The power ratio is information indicating a cause of the congestion degree and can be regarded as "congestion factor information." Alternatively, a ratio of the number of detected LTE interference source apparatuses and the number of detected other system interference source apparatuses may be obtained and used as the congestion factor information.

The LTE beacon signal is transmitted in a broadcasting manner. Alternatively, the LTE beacon signal may include a cell identifier (or an access point identifier) in which high power has been measured in step S21 as a destination and may be transmitted in a unicast manner. The LTE beacon signal transmitted in a unicast manner can be regarded as a request signal for requesting the destination to take an action for interference prevention. The LTE beacon signal may further include an operator identifier indicating the operator to which the destination belongs.

The receiver 220 of the eNB 200B receives the LTE beacon signal.

The controller 230 of the eNB 200B determines whether or not the frequency channel included in the unlicensed band is used in the own eNB 200 on the basis of the LTE beacon signal.

For example, when the measurement result included in the LTE beacon signal is larger than the threshold value, the controller 230 of the eNB 200B determines that the frequency channel corresponding to the measurement result is not used. The controller 230 of the eNB 200B may use both the channel selection based on the LTE beacon signal and the channel selection based on the power detection (energy detection) in its own eNB.

Further, when the LTE beacon signal is destined for its own eNB 200B, it is desirable that the controller 230 of the eNB 200B take, for example, an action of decreasing the transmission power of the frequency channel being used on the basis of the measurement result included in the LTE beacon signal. As described above, upon receiving the LTE beacon signal, the eNB 200B may further give a response (for example, a positive response or a negative response) through the LTE beacon signal.

Modified Example of Second Embodiment

The first embodiment may be combined with the second embodiment. Specifically, the receiver 220 of the eNB 200A receives the measurement report described in the first embodiment from the UE 100. The measurement report includes the identifier of the transmission source of the radio signal detected by the UE 100 in the frequency channel included in the unlicensed band, the measurement result of the reception power of the radio signal, and the like.

Then, the controller 230 of the eNB 200A may include at least part of information included in the measurement report received from the UE 100 in the LTE beacon signal.

Other Modified Examples

In the above embodiment, a use rate (congestion degree) of not only one frequency channel but also all frequency channels may be included in the LTE beacon signal transmitted in one frequency channel.

Alternatively, the use rate (the congestion degree) of one frequency channel (carrier) may be included in the LTE beacon signal transmitted in another frequency channel.

In the first and second embodiments, the example in which the same eNB 200 manages the cell #1 (the licensed band) and the cell #2 (the unlicensed band) has been described. However, the present disclosure can also be applied to even when different eNBs 200 manage the cell #1 (the licensed band) and the cell #2 (the unlicensed band).

In the first and second embodiments, the LTE system has been described as the mobile communication system. However, the present disclosure is not limited to the LTE system. The present disclosure may be applied to systems other than the LTE system.

Third Embodiment

Overview of Third Embodiment

Before transmitting a radio signal in a channel of the unlicensed band, a communication apparatus (for example, a base station) observes a use state of the channel in an observation period having a predetermined time length, and checks whether or not the channel is a free channel. The observation period is also referred to as a LBT period or a clear channel assessment (CCA) period.

In the unlicensed band, a scenario in which a plurality of base stations belonging to different operators are installed to be adjacent to each other is assumed.

In this scenario, the observation period in one base station and the observation period in another base station may overlap at least partially. In this case, each base station does not detect a predetermined amount of reception power (interference power) or more in its observation period for the channel of the unlicensed band and may determine the channel to be the free channel. As a result, a plurality of base stations transmit the radio signal in one channel substantially at the same time, and thus interference is likely to occur.

In this regard, according to the third embodiment, it is possible to prevent the occurrence of interference in the unlicensed band.

A communication apparatus according to the third embodiment includes a controller configured to observe, before a radio signal is transmitted in a channel of an unlicensed band, a use state of the channel in an observation period having a predetermined time length, and check whether or not the channel is a free channel. The controller is further configured to detect a synchronization deviation amount with another communication apparatus on the basis of a radio signal transmitted from the another communication apparatus, and change a start timing of the observation period in accordance with the synchronization deviation amount.

In the third embodiment, the controller changes the start timing of the observation period when the synchronization deviation amount is determined to be less than or equal to a threshold value decided in accordance with a time length of the observation period.

In the third embodiment, when the controller determines that the synchronization deviation amount is equal to or less than the threshold value, and a reference time of the communication apparatus is earlier than a reference time of the other communication apparatus, the controller advances the start timing of the observation period by a predetermined time.

In the third embodiment, the time length of the predetermined time is the time length of the observation period or more.

In the third embodiment, when the controller checks that the channel is a free channel as a result of observing the use state of the channel in the observation period, the controller transmits a reservation signal in a period from an end timing of the observation period to a transmission start timing of the radio signal.

In the third embodiment, when the synchronization deviation amount is the threshold value or less, and a reference time of the communication apparatus is later than a reference time of the other communication apparatus, the controller delays the start timing of the observation period by a predetermined time.

In the third embodiment, the time length of the predetermined time is the time length of the observation period or more.

In the third embodiment, when the synchronization deviation amount is zero or when it is unable to determine whether a reference time of the communication apparatus is earlier or later than a reference time of the other communication apparatus, the controller randomly change the start timing of the observation period.

In the third embodiment, the communication apparatus is a base station belonging to one operator, and the other communication apparatus belongs to another operator.

A communication control method according to the third embodiment is a method in a communication apparatus which observes, before the communication apparatus transmits a radio signal in a channel of an unlicensed band, a use state of the channel in an observation period having a predetermined time length, and checks whether or not the channel is a free channel. The communication control method includes a step of detecting a synchronization deviation amount with the other communication apparatus on the basis of a radio signal transmitted from the other communication apparatus and a step of changing a start timing of the observation period in accordance with the synchronization deviation amount.

The third embodiment will be described focusing on a difference with the first and second embodiments.

(Unlicensed Band)

In the LTE system according to the third embodiment, in addition to the licensed band licensed to the operator, the unlicensed band which need not be licensed is used for LTE communication. Specifically, it is possible to access the unlicensed band with the assistance of the licensed band. This mechanism is referred to as "licensed-assisted access (LAA)."

Figure 10:
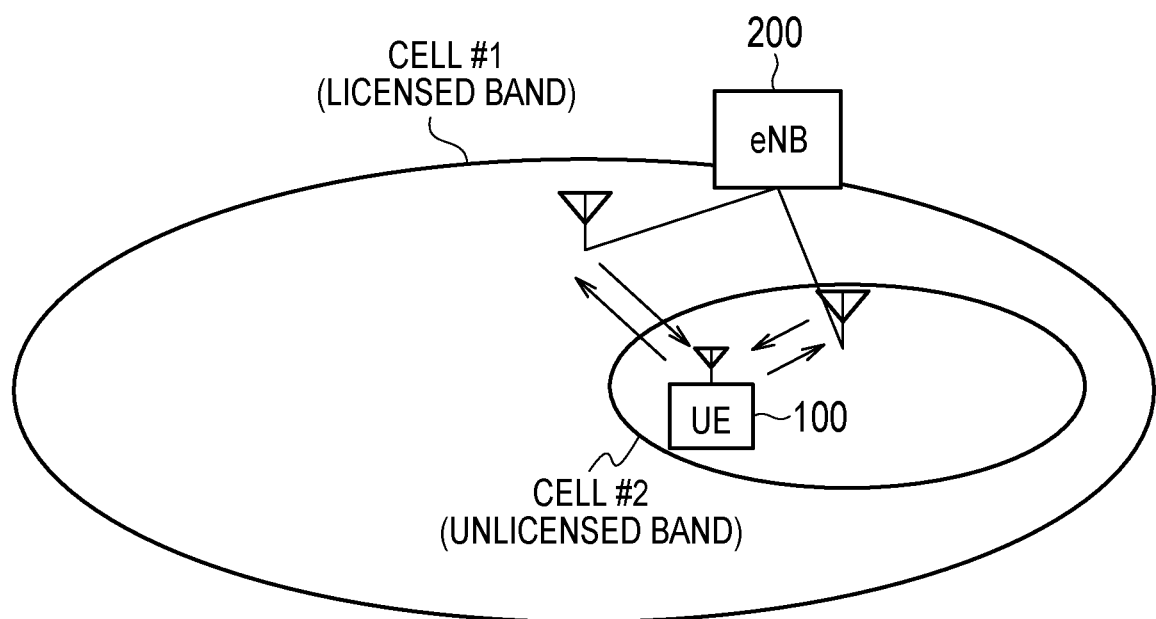
FIG. 10 is a diagram for describing LAA according to a third embodiment.

FIG. 10 is a diagram for describing the LAA. As illustrated in FIG. 10, the eNB 200 manages a cell #1 operated in the licensed band and a cell #2 operated in the unlicensed band. FIG. 10 illustrates an example in which the cell #1 is a macro cell, and the cell #2 is a small cell, but the cell size is not limited thereto.

The UE 100 is located in an overlapping area of the cell #1 and the cell #2. The UE 100 sets the cell #1 as a primary cell (PCell) while setting the cell #2 as a secondary cell (SCell), and performs communication based on carrier aggregation (CA).

In the example of FIG. 10, the UE 100 performs uplink communication and downlink communication with the cell #1 and downlink communication with the cell #2. Through the carrier aggregation, radio resources of the unlicensed band are provided to the UE 100 in addition to radio resources of the licensed band, and thus the throughput can be improved.

(LBT)

In the unlicensed band, the listen-before-talk (LBT) procedure is required to prevent interference with another system different from the LTE system (a wireless LAN or the like) or LTE systems of other operators. The LBT procedure is a procedure of checking whether or not a channel (carrier) of the unlicensed band is free on the basis of the reception power (interference power) and using the frequency channel only when it is checked that it is a free channel (clear channel).

In the third embodiment, before transmitting a radio signal (a control signal or data) in a channel of the unlicensed band, the eNB 200 observes the use state of the channel in the observation period having a predetermined time length, and checks whether or not the channel is a free channel. Hereinafter, the observation period is referred to as an "LBT period."

Figure 11:
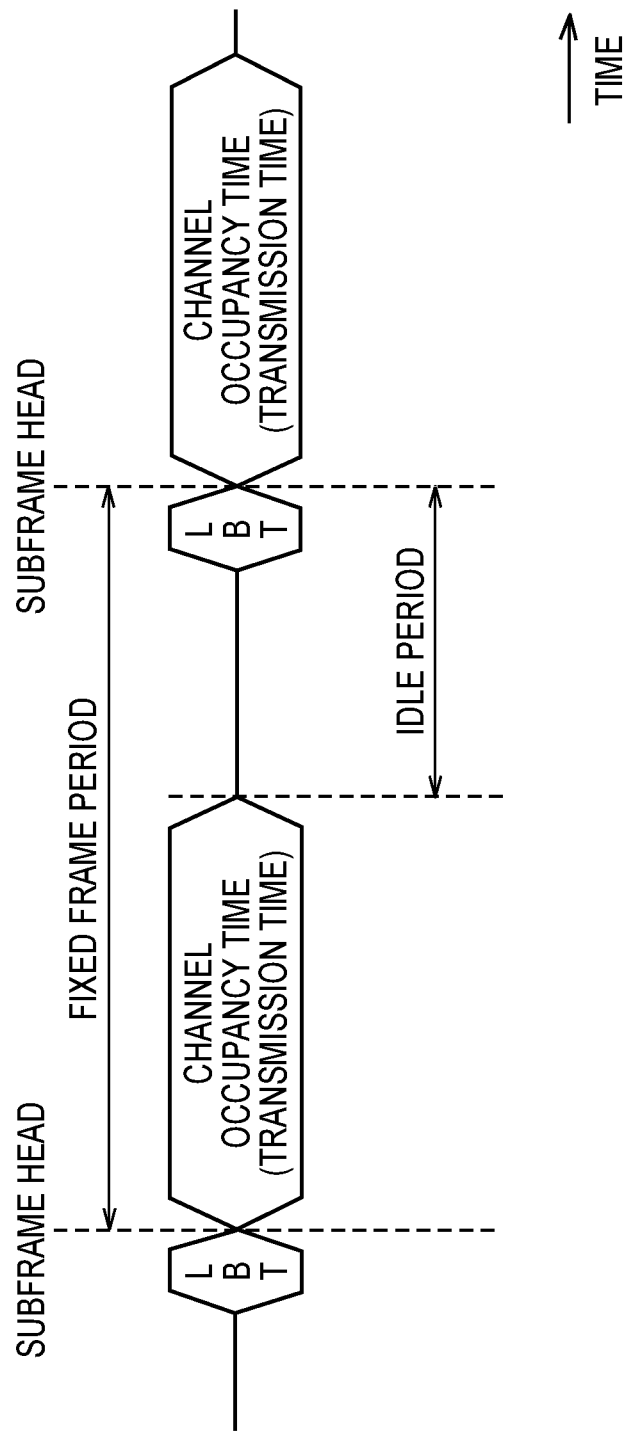
FIG. 11 is a diagram for describing an LBT according to the third embodiment.

FIG. 11 is a diagram for describing the LBT according to the third embodiment. In the third embodiment, a frame based equipment (FBE) which is a type of LBT will be mainly described. The FBE is a scheme having a fixed timing which is not demand driven. On the other hand, a load based equipment (LBE) which is another type of LBT is a demand-driven scheme in which a timing is not fixed.

As illustrated in FIG. 11, the eNB 200 observes the use state of the channel of the unlicensed band in the LBT period immediately before the subframe. The LBT period is, for example, 20 [ps] or more. Specifically, when a predetermined amount of reception power (interference power) or more is detected in the LBT period, the eNB 200 determines that the channel is in use and is on standby until the LBT is performed in a next fixed frame period.

On the other hand, when a predetermined amount of reception power (interference power) or more is not detected in the LBT period, the eNB 200 determines that the corresponding channel is free (clear) and performs transmission using the channel only in a predetermined period (channel occupancy time). For example, the channel occupancy time is in a range of 1 [ms] to 10 [ms]. The eNB 200 does not perform transmission in an idle period after the channel occupancy time elapses. For example, the idle period is a period longer than 5% of the channel occupancy time. Then, the eNB 200 performs the LBT in a next fixed frame period.

As described above, in the FBE scheme, the eNB 200 performs the LBT in each fixed frame period.

(User Terminal)

Figure 12:
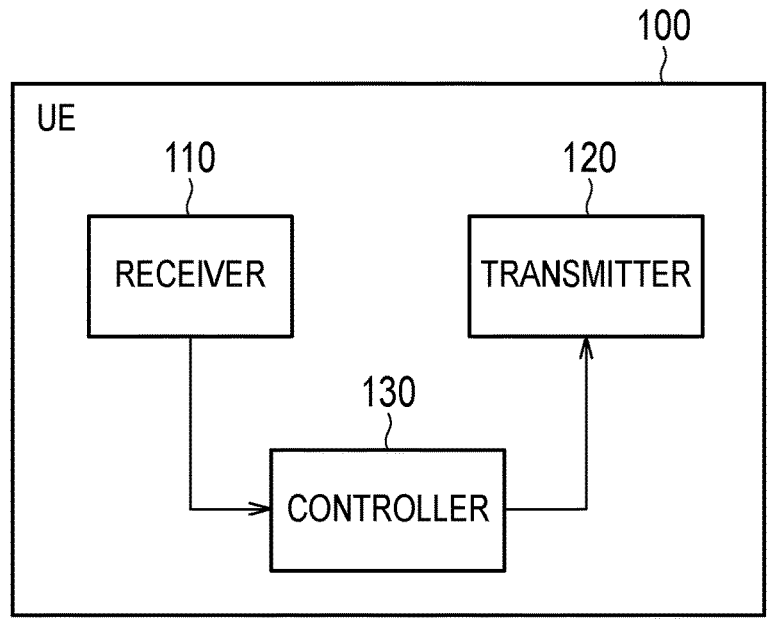
FIG. 12 is a block diagram of a UE according to the third embodiment.

The UE 100 (user terminal) according to the third embodiment will be described will be described below. FIG. 12 is a block diagram of the UE 100. The UE 100 includes a receiver 110, a transmitter 120, and a controller 130 as illustrated in FIG. 12.

The receiver 110 performs various kinds of receptions under the control of the controller 130. The receiver 110 includes an antenna and a receiving device. The receiving device converts a radio signal received through the antenna into a baseband signal (reception signal) and outputs the baseband signal to the controller 130. The receiver 110 may include a first receiving device that receives a radio signal in the licensed band and a second receiving device that receives a radio signal in the unlicensed band.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal from the antenna. The transmitter 120 may include a first transmitting device that transmits a radio signal in the licensed band and a second transmitting device that transmits a radio signal in the unlicensed band.

The controller 130 controls various kinds of control in the UE 100. The controller 130 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor may include a codec that encodes and decodes audio/video signals. The processor executes various kinds of processes to be described later and various kinds of communication protocols described above.

(Base Station)

Figure 13:
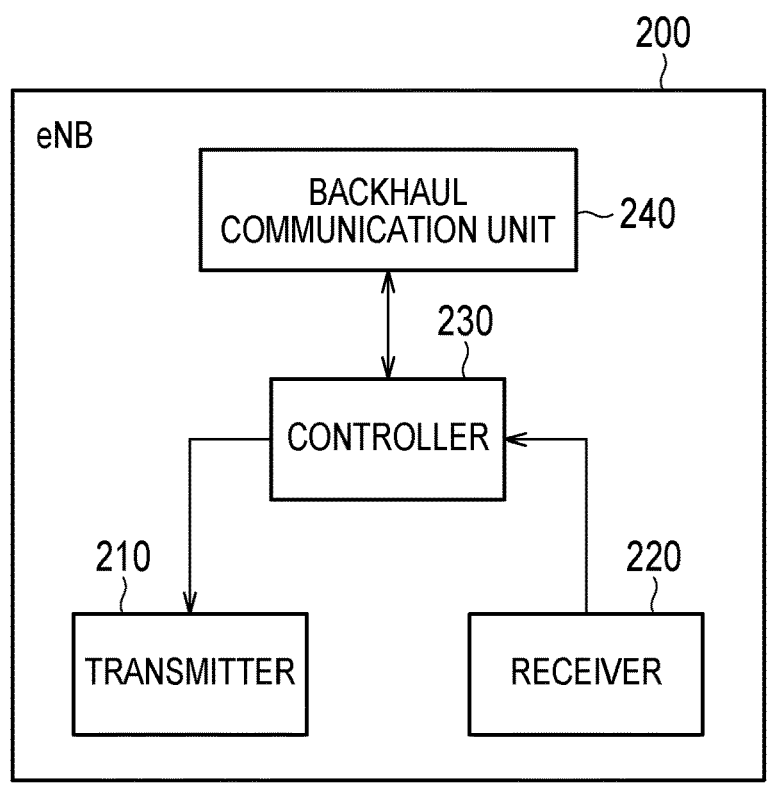
FIG. 13 is a block diagram of an eNB according to the third embodiment.

Next, a configuration of the eNB 200 (base station) will be described. FIG. 13 is a block diagram of the eNB 200. The eNB 200 includes a transmitter 210, a receiver 220, a controller 230, and a backhaul communication unit 240 as illustrated in FIG. 13.

The transmitter 210 transmits various kinds of transmissions under the control of the controller 230. The transmitter 210 includes an antenna and a transmitting device. The transmitting device converts a baseband signal (a transmission signal) output from the controller 230 into a radio signal and transmits the radio signal from the antenna. The transmitter 210 may include a first transmitting device that transmits a radio signal in the licensed band and a second transmitting device that transmits a radio signal in the unlicensed band.

The receiver 220 receives various kinds of receptions under the control of the controller 230. The receiver 220 includes an antenna and a receiving device. The receiving device converts a radio signal received by the antenna into a baseband signal (reception signal) and outputs the baseband signal to the controller 230. The receiver 220 may include a first receiving device that receives a radio signal in the licensed band and a second receiving device that receives a radio signal in the unlicensed band.

The controller 230 controls various kinds of controls in the eNB 200. The controller 230 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor executes various kinds of processes to be described later and various kinds of communication protocols described above.

The backhaul communication unit 240 is connected to the neighbor eNB 200 via the X2 interface and connected to the MME/S-GW 300 via the S1 interface. The backhaul communication unit 240 is used for communication performed via the X2 interface, communication to be performed via the S1 interface, and the like.

An overview of an operation of the eNB 200 having the above configuration will be described. In the eNB 200, before transmitting the radio signal in the channel of the unlicensed band, the controller 230 observes the use state of the channel in the LBT period having a predetermined time length, and checks whether or not the channel is a free channel.

The controller 230 detects the synchronization deviation amount with another eNB 200 on the basis of the radio signal transmitted from the other eNB 200 and changes the start timing of the LBT period in accordance with the synchronization deviation amount. In the third embodiment, its own eNB 200 belongs to one operator, and another eNB 200 belongs to another operator.

The radio signal transmitted from another eNB 200 is a beacon signal, a discovery reference signal (DRS), a synchronization signal, or the like. The signals include information identifying the transmission source cell. The signals may include information identifying the operator to which the transmission source cell belongs. Further, the signals may include an LBT setting parameter (for example, the time length of the LBT period) in another eNB 200. Further, the signals may include information indicating the transmission power of the signal. Alternatively, the transmission power of the signal may be specified in advance.

The controller 230 changes the start timing of the LBT period when the synchronization deviation amount is equal to or less than a threshold value decided in accordance with the time length of the LBT period (for example, 20 [µs]). Hereinafter, the threshold value is assumed to be the same value as the time length of the LBT period. However, when overlapping between the LBT period of its own eNB 200 and the LBT period of another eNB 200 (hereinafter referred to as an "LBT overlap time") is small, the overlapping may be allowed. Therefore, the threshold value may be smaller than the time length of the LBT period (for example, 20 [µs]).

In the third embodiment, the controller 230 changes the start timing of the LBT period of its own eNB 200 when the LBT period of its own eNB 200 is determined to overlap the LBT period of another eNB 200 at least partially. Specifically, when the LBT period of its own eNB 200 is determined to overlap the LBT period of another eNB 200 at least partly, the controller 230 changes the start timing of the LBT period of its own eNB 200 so that the LBT period of its own eNB 200 does not overlap the LBT period of another eNB 200.

FIGS. 14A to 14C are diagrams illustrating a first operation example of the eNB 200 according to the third embodiment. Hereinafter, its own eNB 200 is indicated by an eNB 200A, and another eNB 200 of another operator is indicated by an eNB 200B.

As illustrated in FIGS. 14A and 14B, when the synchronization deviation amount between the eNB 200A and the eNB 200B is the time length of the LBT period or less, and a subframe head (reference time) of the eNB 200A is ahead of the subframe head (reference time) of the eNB 200B. The subframe head (reference time) of the eNB 200B can be specified from the radio signal transmitted from the other eNB 200. Further, when the transmission power of the radio signal transmitted from another eNB 200 is detected, the controller 230 of the eNB 200A calculates a propagation loss (path loss) on the basis of the transmission power and the reception power of the radio signal and calculates a propagation delay with the eNB 200B. Then, the subframe head (reference time) of the eNB 200B may be estimated in view of the propagation delay. However, the process of deriving the propagation delay is not indispensable, and the process may not be performed.

In the situation illustrated in FIGS. 14A and 14B, the controller 230 of the eNB 200A advances the start timing of the LBT period of the eNB 200A by a predetermined time as illustrated in FIG. 14C. The predetermined time is the time length of the LBT period or more. Alternatively, when the eNB 200B is assumed to delay the start timing of the LBT period of the eNB 200B, the predetermined time may be half or more of the time length of the LBT period. Alternatively, when a short LBT overlap time is allowed, the predetermined time may be less than the time length of the LBT period.

In the example illustrated in FIG. 14C, the LBT period of the eNB 200A is set to a 1 LBT period prior to the original LBT period illustrated in FIG. 14A. Here, the "1 LBT period" is a predetermined time length (for example, 20 [µs]). Alternatively, when the eNB 200A acquires the LBT setting parameter of the eNB 200B, the "1 LBT period" may be the time length of the LBT period set in the eNB 200B.

As illustrated in FIG. 14C, when it is checked that the channel is a free channel as a result of observing the use state of the channel in the LBT period, the controller 230 of the eNB 200A transmits a reservation signal from the end timing of the LBT period to the transmission start timing (that is, the subframe head) of the radio signal (the control signal or data). The "reservation signal" is a signal which is transmitted so that the channel is not determined to be a free channel by another apparatus, that is, the signal is a signal (a dummy signal) different from the control signal or data.

FIGS. 15A to 15C are diagrams illustrating a second operation example of the eNB 200 according to the third embodiment. Further, description of an operation similar to the first operation example will be omitted.

As illustrated in FIGS. 15A and 15B, the synchronization deviation amount between the eNB 200A and the eNB 200B is the time length of the LBT period or less, and the subframe head (reference time) of the eNB 200A is later than the subframe head (reference time) of the eNB 200B.

In this case, as illustrated in FIG. 15C, the controller 230 of the eNB 200A delays the start timing of the LBT period of the eNB 200A by a predetermined time. The predetermined time is the time length of the LBT period or more.

Alternatively, when that the eNB 200B is assumed to advance the start timing of its own LBT period, the predetermined time may be half or more of the time length of the LBT period. Alternatively, when a short LBT overlap time is allowed, the predetermined time may be less than the time length of the LBT period.

In the example illustrated in FIG. 15C, the LBT period of the eNB 200A is set to a 1 LBT period after the original LBT period illustrated in FIG. 15A. The LBT period of the eNB 200A starts from the subframe head of the eNB 200A.

It is also assumed that the eNB 200B and the eNB 200B are perfectly synchronized, that is, the synchronization deviation amount is zero. In this case, the controller 230 of the eNB 200A randomly changes the start timing of the LBT period (on the basis of a random number). For example, it is randomly selected whether the start timing of the LBT period is advanced (see FIGS. 14A to 14C) or the start timing of the LBT period is delayed (see FIGS. 15A to 15C). Further, a time by which the start timing of the LBT period is advanced or delayed may be randomly selected.

(Operation Flow)

Figure 16:
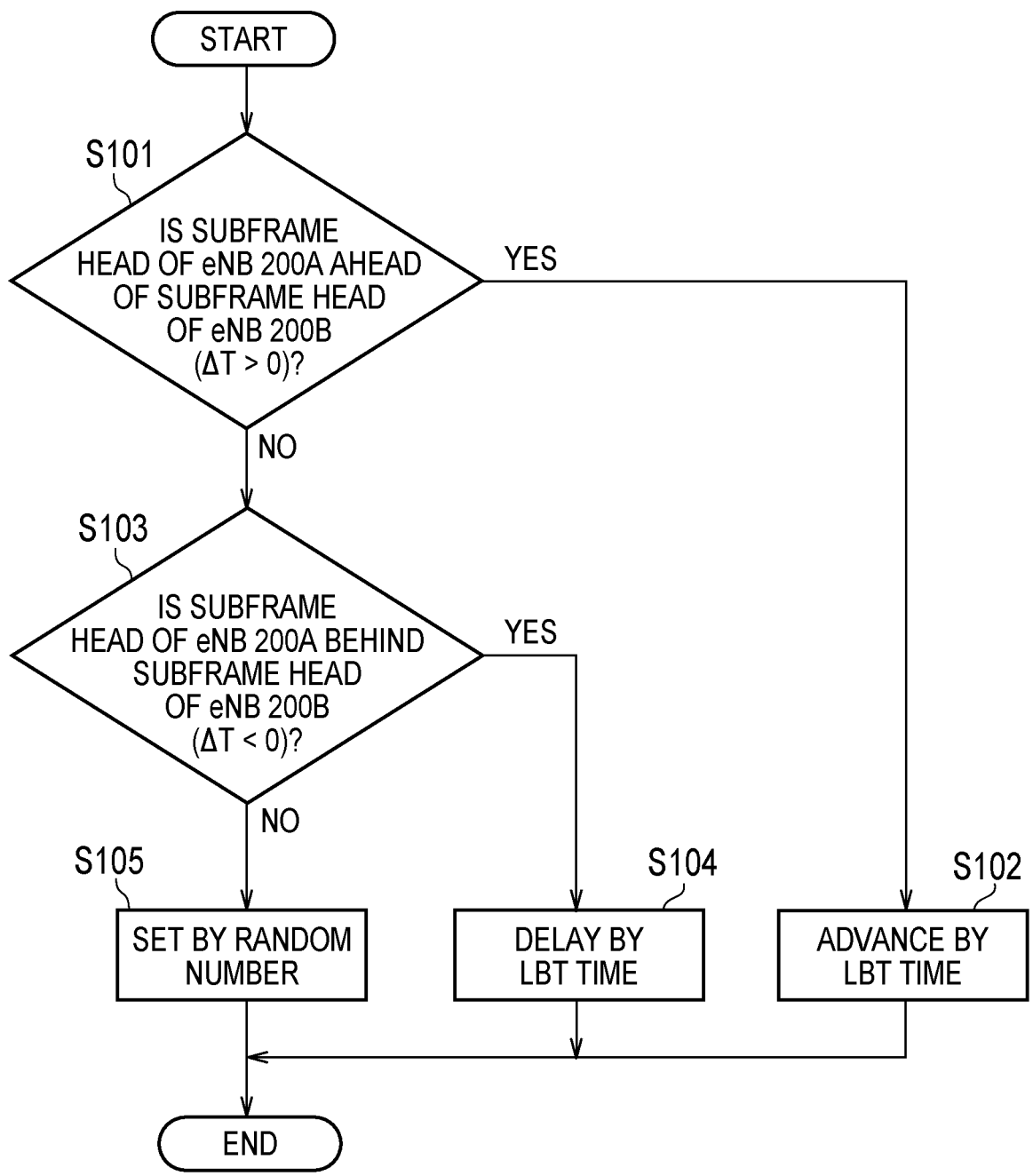
FIG. 16 is an operation flow chart of an eNB according to the third embodiment.

FIG. 16 is an operation flow chart of the eNB 200 (eNB 200A) according to the third embodiment. This flow is under the assumption that the synchronization deviation amount ($\Delta T$) between the eNB 200A and the eNB 200B is a threshold value (for example, the time length of the LBT period) or less. Here, "$\Delta T$" indicates "synchronization timing of eNB 200W"–"synchronization timing of eNB 200A." When "$\Delta T > 0$," the eNB 200A is ahead of the eNB 200B. On the other hand, when "$\Delta T < 0$," the eNB 200A is behind the eNB 200B.

As illustrated in FIG. 16, when the subframe head of the eNB 200A is determined to be ahead of the subframe head of the eNB 200B (YES in step S101), in step S102, the eNB 200A delays the start timing of its own LBT period by a predetermined time (for example, a 1 LBT time).

When the subframe head of the eNB 200A is determined to be behind the subframe head of the eNB 200B (NO in step S101 and YES in step S103), in step S104, the eNB 200A delays the start timing of its own LBT period by a predetermined time (for example, a 1 LBT time).

When the subframe head of the eNB 200B is aligned with the subframe head of the eNB 200A (NO in step S101 and NO in step S103), in step S105, the eNB 200A randomly changes the start timing of its own LBT period.

Conclusion of Third Embodiment

According to the third embodiment, when the LBT period of the eNB 200A and the LBT period of the eNB 200B overlap at least partially, the eNB 200A changes the start timing of its own LBT period so that the LBT period of the eNB 200A and the LBT period of the eNB 200B do not overlap. Therefore, it is possible to prevent the interference caused when the eNB 200A and the eNB 200B transmit the radio signal in the same channel substantially at the same time.

Modified Example of Third Embodiment

The third embodiment is under the assumption that the cell of the unlicensed band is a small cell, and the propagation delay between the eNB 200A and the eNB 200B is negligibly small.

Figure 17:
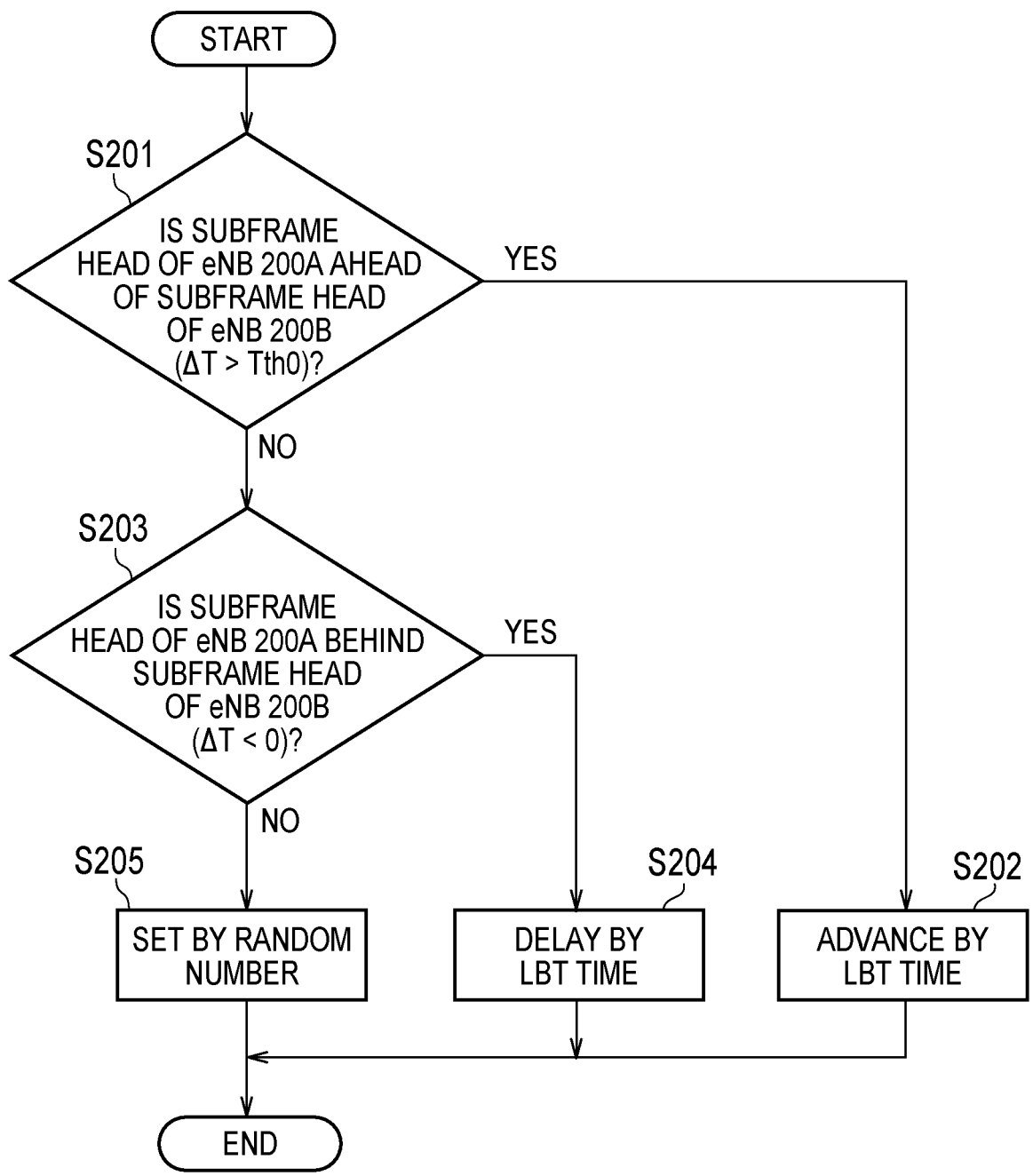
FIG. 17 is an operation flow chart of an eNB according to a modified example of the third embodiment.

In the present modified example, the propagation delay between the eNB 200A and the eNB 200B is assumed to be unknown, and an operation in which the presence of the propagation delay is considered is performed. FIG. 17 is an operation flow chart of the eNB 200 (eNB 200A) according to the present modified example. This flow is under the assumption that the synchronization deviation amount ($\Delta T$) between the eNB 200A and the eNB 200B is a threshold value (for example, the time length of the LBT period) or less. As illustrated in FIG. 17, a determination (step S201) about whether or not the subframe head of the eNB 200A is ahead of the subframe head of the eNB 200B is different from that in the flow of the third embodiment (see FIG. 16). Specifically, when the synchronization deviation amount ($\Delta T$) is larger than a predetermined threshold value (Tth0) (YES in step S201), the eNB 200A determines that the subframe head of the eNB 200A is ahead of the subframe head of the eNB 200B. The other steps (steps S202 to S205) are similar to those in the flow of the third embodiment. Here, Tth0 may be a value based on a cyclic prefix (CP) length (for example, the CP length×$\alpha$).

As described above, the eNB 200A specifies the synchronization timing (reference time) of the eNB 200B on the basis of the radio signal received from the eNB 200B. Here, the radio signal received by the eNB 200A is affected by the propagation delay. Therefore, when the synchronization timing of the eNB 200A is equal to the synchronization timing of the received radio signal, it is apparent that the synchronization timing of the eNB 200A is actually later than the synchronization timing of the eNB 200B.

On the other hand, if the case in which the synchronization timing of the eNB 200A is earlier than the synchronization timing of the eNB 200B is considered, when the propagation delay is known, the synchronization timing of the eNB 200A can be regarded as being earlier than the synchronization timing of the eNB 200B when the synchronization timing of the eNB 200A is earlier than of the synchronization timing of the eNB 200B (the reception time–the propagation delay). However, when the propagation delay time is unknown, it is necessary to set a threshold value (Tth0) corresponding to an assumed propagation delay time. Therefore, the eNB 200A determines that the subframe head (the synchronization timing) of the eNB 200A is ahead of the subframe head (the synchronization timing) of the eNB 200B only when the synchronization deviation amount ($\Delta T$) is larger than the threshold value (Tth0).

In the present modified example, when the synchronization deviation amount ($\Delta T$) is zero or more and the threshold value (Tth0) or less, the eNB 200A randomly changes the start timing of its own LBT period (step S205). In other words, the eNB 200A randomly changes the start timing of its own LBT period when it is unable to determine whether the synchronization timing of the eNB 200B is earlier or later than its own synchronization timing.

Other Modified Examples

In the third embodiment, the eNB 200A and the eNB 200B are assumed to be installed to be adjacent to each other. However, when the eNB 200A and the eNB 200B are not installed to be adjacent to each other, and a problematic level of interference does not occur, the operation according to the above third aspect may not be performed. The eNB 200A may perform the operation according to the third embodiment only when the reception power of the radio signal from the eNB 200B is the threshold value or more.

In the third embodiment, the example in which the start timing is used as a reference has been described, but the end timing may be used as a reference.

In the third embodiment, the example in which the present disclosure is applied to downlink has been mainly described. However, the present disclosure is not limited to downlink, and the present disclosure may be applied to uplink. In this case, the user terminal can be used as the communication apparatus according to the present disclosure.

In the third embodiment, the example in which the same eNB 200 manages the cell #1 (the licensed band) and the cell #2 (the unlicensed band) has been described. However, the present disclosure can also be applied to a case in which different eNBs 200 manage the cell #1 (the licensed band) and the cell #2 (the unlicensed band).

In the third embodiment, the LTE system has been described as the mobile communication system. However, the present disclosure is not limited to the LTE system. The present disclosure may be applied to systems other than the LTE system.

Fourth Embodiment

Overview of Fourth Embodiment

A base station according to the fourth embodiment includes a controller configured to perform a process of transmitting transmission data through a physical downlink shared channel (PDSCH). The controller performs a process of transmitting predetermined data as a reservation signal for reserving a channel before transmitting the transmission data. The predetermined data includes at least a part of the transmission data.

In the fourth embodiment, the predetermined data is data from a head of the transmission data to a predetermined number of symbols.

In the fourth embodiment, the predetermined data is data from a tail of the transmission data to a predetermined number of symbols.

In the fourth embodiment, the controller changes an arrangement order of the predetermined data to a predetermined arrangement order. The predetermined arrangement order is an order opposite to the arrangement order of the transmission data, or a random order.

A user terminal according to the fourth embodiment includes a controller configured to perform a process of receiving predetermined data carried through a reservation signal and transmission data carried through a Physical Downlink Shared Channel (PDSCH) arranged after the predetermined data from a base station and a predetermined decoding process. The predetermined data includes at least a part of the transmission data. The predetermined decoding process includes a process of combining the predetermined data as redundant data of the transmission data.

The user terminal according to the fourth embodiment includes a controller configured to perform a radio resource management (RRM) measurement process, and a report process of reporting a measurement result for a plurality of cells to a base station together with an operator ID. The measurement result includes a reference signal received power (RSRP) and/or a reference signal received quality (RSRQ), and a received signal strength indicator (RSSI).

In the fourth embodiment, the controller periodically performs the report process.

In the fourth embodiment, when the RRM measurement process is performed twice or more at periodical report process timings, the controller reports two or more measurement results to the base station.

In the fourth embodiment, when the RSRP is a predetermined value or more, the controller performs the report process.

In the fourth embodiment, in the report process, the controller performs a process of reporting in order from the measurement result related to the cell having a large RSRP.

In the fourth embodiment, the controller performs a process of acquiring information related to a cycle for the report process, from the base station.

In the fourth embodiment, the controller performs a process of acquiring information related to the predetermined value, from the base station.

The fourth embodiment will be described focusing on a difference with the first to third embodiments.

(Reservation Signal According to Fourth Embodiment)

A reservation signal according to the fourth embodiment will be described.

Figure 25:
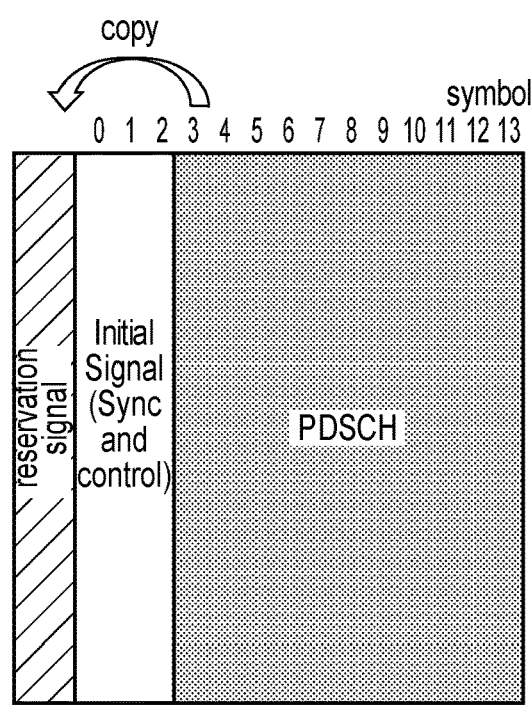
FIG. 25 is a diagram illustrating an example of a reservation signal according to the additional note 4.

Step 1: The eNB 200 generates predetermined data from transmission data transmitted through the PDSCH (hereinafter referred to as "PDSCH data"). The predetermined data may be referred to as dummy data or may be referred to as redundant data. For example, as illustrated in FIG. 25, the eNB 200 copies a part of the PDSCH data and uses the copy as the predetermined data. The predetermined data is data of some symbol sections of the PDSCH data. Some symbol sections are sections of up to a predetermined number of symbols (for example, one symbol or two symbols) from the head of the PDSCH data. Alternatively, some symbol sections may be a section of up to a predetermined number of symbols (for example, one symbol or two symbols) from the tail of the PDSCH data. The eNB 200 may change an arrangement order of the data of some symbol sections of the PDSCH data (hereinafter referred to as "a part of the PDSCH data") to a predetermined arrangement order and generate the part of the PDSCH data having the changed arrangement order as the predetermined data. The predetermined arrangement order is an order opposite to the arrangement order of the part of the PDSCH data or a random order. The predetermined arrangement order may be notified from the eNB 200 to the UE 100 or may be predefined in accordance with a system specification.

Step 2: The eNB 200 transmits the predetermined data as the reservation signal for reserving the channel. The UE 100 receives the reservation signal (the predetermined data). The UE 100 stores the received reservation signal (the predetermined data). As illustrated in FIG. 25, the eNB 200 may transmit an initial signal after transmitting the reservation signal (the predetermined data).

Step 3: The eNB 200 transmits the PDSCH data. The UE 100 receives the PDSCH data. In the decoding process of the PDSCH data, the UE 100 combines the stored reservation signal (the predetermined data) with the PDSCH data. As described above, the UE 100 can improve a reception characteristic of the PDSCH data by performing the decoding process using the reservation signal (the predetermined data).

(Measurement Report According to Fourth Embodiment)

A measurement report according to the fourth embodiment will be described. The operation according to the first embodiment may be combined with the measurement report according to the fourth embodiment.

The UE 100 performs measurement (RRM measurement) and transmits a measurement report including a measurement result to the eNB 200. In addition to a normal RRM measurement result, the UE 100 reports a detected cell ID and signal power in the unlicensed band (LAA carrier) (see FIG. 23 and Table 1). The normal RRM measurement result includes an RSRP and/or an RSRQ. In the fourth embodiment, the UE 100 includes an operator ID detected in the unlicensed band in the measurement report. Further, the UE 100 includes an RSSI in the unlicensed band in the measurement report. Here, unlike the RSRP and/or the RSRQ obtained in units of cells, the RSSI is a measurement value obtained in units of predetermined frequencies. The predetermined frequency is, for example, a frequency band or a component carrier (CC).

The UE 100 periodically performs a report process. The UE 100 may transmit one measurement report including two or more measurement results to the eNB 200 when the RRM measurement process is performed twice or more at periodical report process timings. The eNB 200 may set a report period in the UE 100, and the UE 100 may perform the report process in accordance with the set reporting period.

Alternatively, the UE 100 may perform the report process using the occurrence of a predetermined event as a trigger. For example, the UE 100 performs the report process when the RSRP is a predetermined value (threshold value) or more. The eNB 200 may configure a trigger event and a threshold value in the UE 100, and the UE 100 may perform the report process in accordance with to the configured trigger event and threshold value.

Fifth Embodiment

Overview of Fifth Embodiment

A base station according to the fifth embodiment includes a controller configured to check the presence or absence of a free channel before transmitting an initial signal in an unlicensed band. The controller is configured to transmit a reservation signal until a symbol capable of being used for starting transmission of the initial signal starts, after completion of the checking. The reservation signal can be used as a cyclic prefix.

In the fifth embodiment, when the reservation signal has a certain length or more, the reservation signal is used as the cyclic prefix and used for transmitting other signal.

In the fifth embodiment, the other signal is a random signal.

In the fifth embodiment, the certain length is a length less than or equal to a length obtained by subtracting the cyclic prefix length from an effective OFDM symbol length which is a length obtained by subtracting a cyclic prefix length from one OFDM symbol length.

A fifth embodiment will be described focusing on a difference with the first to fourth embodiments.

(Operation Related to Fifth Embodiment)

Figure 18:
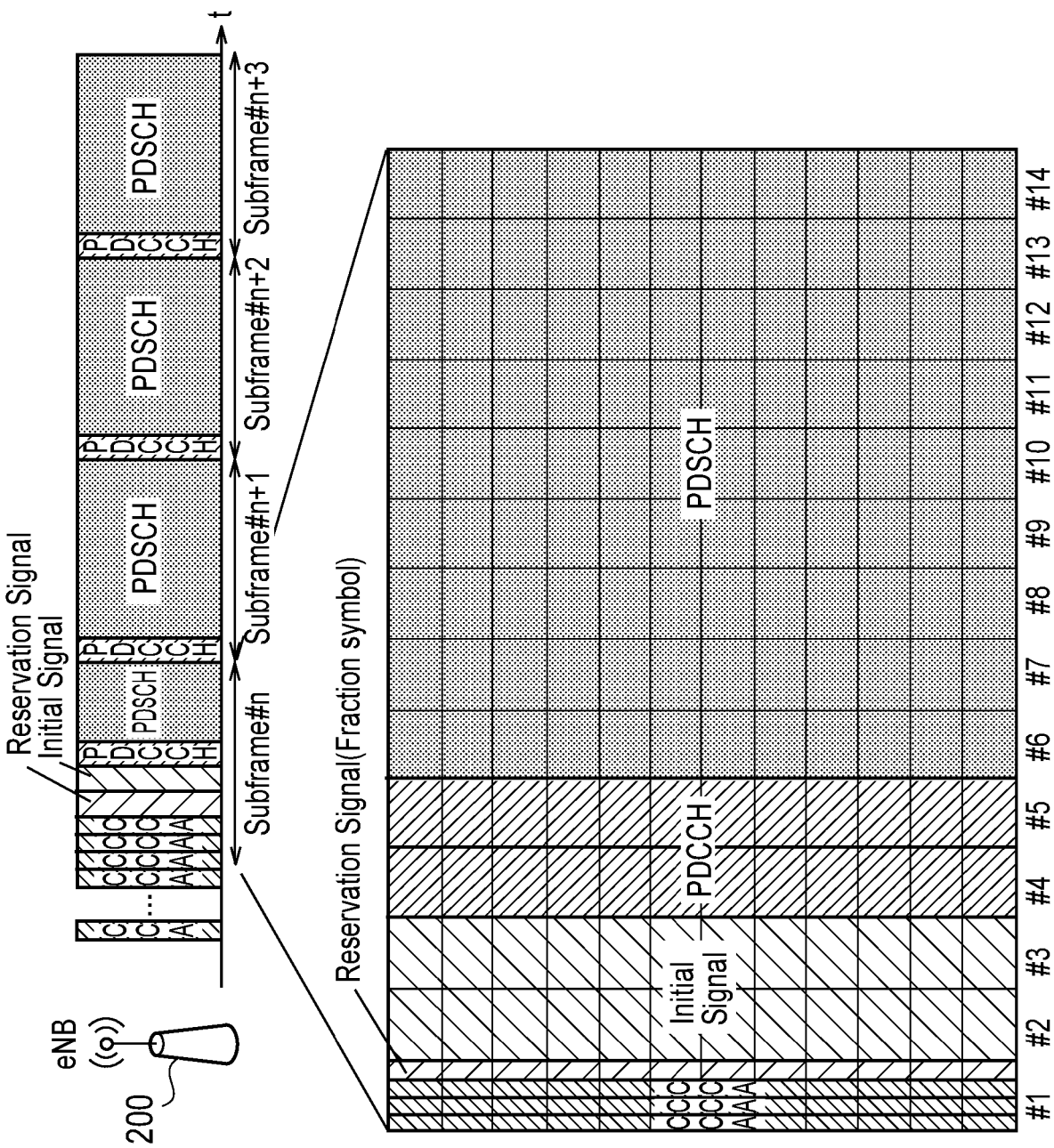
FIG. 18 is a diagram illustrating a signal transmitted by an eNB according to a fourth embodiment.

As illustrated in FIG. 18, the eNB 200 starts downlink transmission after succeeding in CCA (LBT). FIG. 18 illustrates an example in which the eNB 200 succeeds in the CCA in the middle of a first symbol section #1 of a subframe #n. In this case, the eNB 200 performs the reservation signal, the initial signal, the control signal (PDCCH), and data (PDSCH) in the described order.

The reservation signal is a signal for occupying a target channel until a start point in time of a symbol section at which transmission of the initial signal is able to be started (a start point in time of a next symbol (#2)) so that other apparatuses do not interrupt the target channel when the CCA is completed in the middle of the symbol section (#1).

The eNB 200 uses the reservation signal as the cyclic prefix (CP) of the initial signal (or an extension of the CP). In other words, the eNB 200 inserts the extension of the CP in the period of the reservation signal (a period from the completion of the CCA to the start of the next symbol section (#2)). For example, the extension of the CP is the same one (copy) obtained by extending the CP in the next OFDM symbol (the OFDM symbol in which the initial signal can be transmitted) to the front on the time axis.

On the other hand, when the eNB 200 uses the reservation signal as the CP by a certain length (a certain time length) or more, the OFDM signal (effective OFDM symbol) corresponding to two cycles are inserted, and a timing extraction error is likely to occur. The certain length (the certain time length) indicates a length which is equal to or less than a length obtained by subtracting the CP length from the effective OFDM symbol length (the length obtained by subtracting the CP length from one OFDM symbol length).

In this regard, when the reservation signal (the period between the CCA completion and the start point of the next symbol section) has the certain length or more, the eNB 200 uses the reservation signal not only as the CP but also uses it for transmission of a random signal. Specifically, the eNB 200 uses a time region other than a region used as the CP in the reservation signal for transmission of the random signal. Further, a positional relation between the random signal and the CP in the reservation signal is, for example, that on the time axis, transmission of the random signal is located ahead of the CP, and the CP is located behind of it (the CP is located immediately ahead of the next symbol start point, and the random signal is located behind it).

The random signal may be a signal which is not related to the next OFDM symbol such as an additive white Gaussian noise (AWGN). Further, a part of one generated for one OFDM symbol may be used as the random signal. Specifically, the eNB 200 maps a uniform random signal having an amplitude of (−1, 1) and a phase of (180, −180) to all resource elements (RE) in one OFDM symbol. Then, the eNB 200 changes the mapped signal to a time region, and uses a necessary time region (a time region other than the time region used as the CP in the reservation signal) in the mapped signal. Here, the random signal has been described as an example, but a signal other than the random signal may be used.

Here, the example in which the transmission of the initial signal starts in the next symbol section (#2) has been described, but the present disclosure is not limited to this example, and for example, the transmission of the initial signal may start in a symbol section (#n) away from the symbol section (#1) (n≤3). In this case, the length of the reservation signal is one OFDM symbol length or more, and instead of using the reservation signal as the CP, the eNB 200 may use it as transmission of a redundant signal of a subframe in which the reservation signal is positioned or may use it as transmission of the reference signal.

Next, supplementary matters of the first to fifth embodiments will be described.

APPENDIX 1

(1. Introduction)

It is well known as more access points share the same channel the more system throughput performance is degraded. For fair coexistence between the Wi-Fi and the LAA services, it is proposed that the similar WiFi mechanisms need to be introduced for LAA operation such as Listen-before-talk (Clear channel assessment) and discontinuous transmission on a carrier with limited maximum transmission duration. Therefore, it is assumed throughput performance degradation cannot be avoided as long as LAA cell share the same band with other access points.

On the other hand, it's worth studying the coordination mechanism between the LAA services of different operators. The coordination mechanism consists of channel selection and channel sharing between multi-operator LAA services. This coordination could result into better interference management. In this Appendix, we present a mechanism for the tight coordination mechanism between more than one LAA services, in particular the LTE Beacon, the LTE Header and a new UE measurement report.

(2. Possible Functionalities of LTE Beacon)

It is preferable if the LAA cell (re)select the lowest loaded channel for its operation. In order to achieve this aim the LAA cell should be aware of the radio environment of unlicensed band. We propose that the unlicensed spectrum usage information is shared with the neighboring nodes by broadcasting the information. This broadcast information is delivered over the "LTE Beacon". The neighboring LAA services can detect neighboring LTE Beacons and then select a channel using that information and set their own LAA parameters appropriately. After receiving the above information the neighboring eNBs can also broadcast their own beacon as well. One of the candidate contents of LTE Beacon is the traffic load information of unlicensed spectrum, the number of LBT failures or the number of usage channels.

Figure 19:
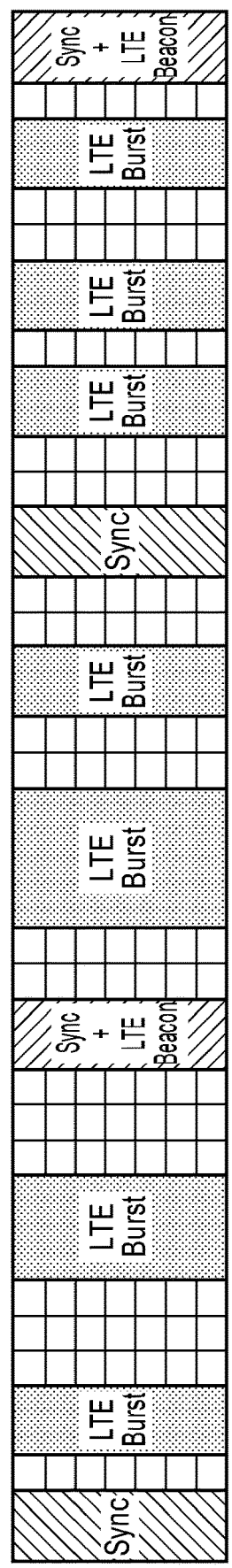
FIG. 19 is a diagram illustrating an example of LTE beacon transmission according to an additional note 1.

In addition, LTE Beacon can also be used for sharing one unlicensed spectrum CC by more than one LAA service. It can be assumed different operator LAA cells share the same channel in the time division manner. The configurations of unlicensed spectrum's synchronization signal and/or reference signal are provided on the proposed LTE Beacon resulting a tighter coordination. A study is needed for the transmission timing of the LTE Beacon. In our opinion, it should be transmitted on the same subframe in which the synchronization signals are transmitted. This is very much similar to concept of Broadcast channel (PBCH) which is located on the same subframe along with the PSS/SSS. An example of LTE Beacon transmission is shown in FIG. 19. FFS if the LTE beacon should be transmitted with every synchronization signal transmission.

Proposal 1: The unlicensed spectrum usage information should be broadcasted to other operators over LTE Beacons.

(3. Possible Functionalities of LTE Header)

Figure 20:
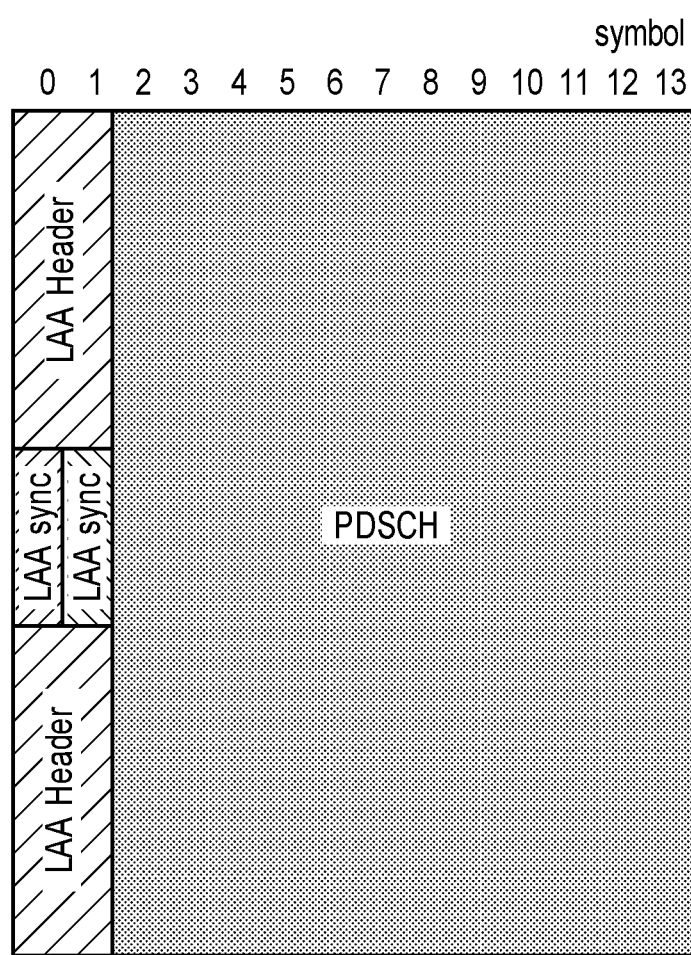
FIG. 20 is a diagram illustrating an example of an LAA header according to the additional note 1.

In this section we consider further sharing of LAA cell's resource allocation information resulting in further efficient usage of the unlicensed spectrum. For example, if the LAA cell is aware of the data transmission duration of the other LAA cell then eNB can suspend LBT during that duration. Therefore, we propose RAN1 should study if some level of resource allocation information on the unlicensed spectrum should be broadcasted as well. This information should be conveyed over the "LTE Header" and transmitted in a header located at the beginning of the data burst. It's assumed the LTE Header has a similar function as the current Rel-8 PDCCH. This header can be read by the neighboring LAA cells to obtain resource usage information by the transmitting eNB. We show the example how LAA Header maps in FIG. 20. FIG. 20 is also shown the LAA sync, which we proposed. FFS the location of LAA Header Proposal 2: RAN1 should study if some level of resource allocation information on the unlicensed spectrum should be broadcasted in a header signal.

(4. UE Measurement Enhancement)

RAN1 should study if the hidden node problem should be taken into account when designing the channel selection procedures/schemes. To deal with the hidden node problem, we propose to introduce a new UE measurement report mechanism. In the measurement report, UE report the detecting Cell ID and signal power on the unlicensed band in addition to the current RRM measurement result. In our view, UE can detect the non-serving cell's DRS (including other operator's LAA) and calculate the DRS RSRP by itself. The eNB that receives this report from the UE can take appropriate action needed to mitigate the hidden node problem.

Proposal 3: New UE measurement report mechanism should be introduced that allows a UE to report the detected non-serving LAA cell's information.

In addition, there is a potential issue if the same PCI is used by multiple operators. Same PCI should not be allocated to the neighboring cell. Within an operator's network, it can be achieved by cell planning or SON function. However, the problem remains when the same PCI is used by other operators located in the proximity of the first operator. In our opinion, either UE assisted or eNB based PCI collision avoidance mechanism in unlicensed spectrum should be introduced.

Proposal 4: PCI collision avoidance mechanism in unlicensed spectrum should be introduced.

APPENDIX 2

(1. Introduction)

RAN1 is requested to determine a single global solution for LAA. Therefore, one unified LAA solution meeting the regulations of each country or region should be studied. Since the regulations of unlicensed spectrum are different in each country or region, it is desirable to design a system using the most stringent countries' and regions' regulations. In this Appendix, we discuss the LAA Frame structure based on our simulation result.

(2. Necessity of LBT in LAA)

RAN1 has agreed to introduce Listen-before-talk (Clear channel assessment) and discontinuous transmission on a carrier with limited maximum transmission duration to meet the regulatory requirements for some regions/bands. As a consequence the "bursty" transmissions using Listen-before-talk (LBT) are transmitted by the nodes in unlicensed spectrum and deployed in certain countries/regions. Since a single global solution is expected, we propose to limit the duration of the transmission bursts to maximum of 4 ms meeting the most stringent requirement i.e., Japanese regulation. As an alternative configurable burst durations could also be considered. However, according to the European regulation, the minimum gap length between contiguous bursts depends on the burst length. To satisfy both the configurable burst length and the gap related to the burst length, the frame design could be complicated and we believe a simple solution of a single burst length in the standards is preferable. In addition, having a fixed burst length based frame structure helps to reduce the standardization workload.

Although this frame structure is required only for Europe and Japan, we suggest LBT and discontinuous transmission should be mandatory features for LAA operation. These features are also beneficial in achieving fair coexistence with other technologies such as Wi-Fi. We did preliminary evaluation based on the above assumption and show the effectiveness of LBT. Other companies have also shown WLAN throughput is significantly degraded if LBT is not applied to LTE.

Proposal 1: LBT and discontinuous transmission should be mandatory features for LAA operation.

Proposal 2: The maximum transmission duration of a transmission burst should be 4 ms.

(3. Analysis of Frame Structure)

Figure 21:
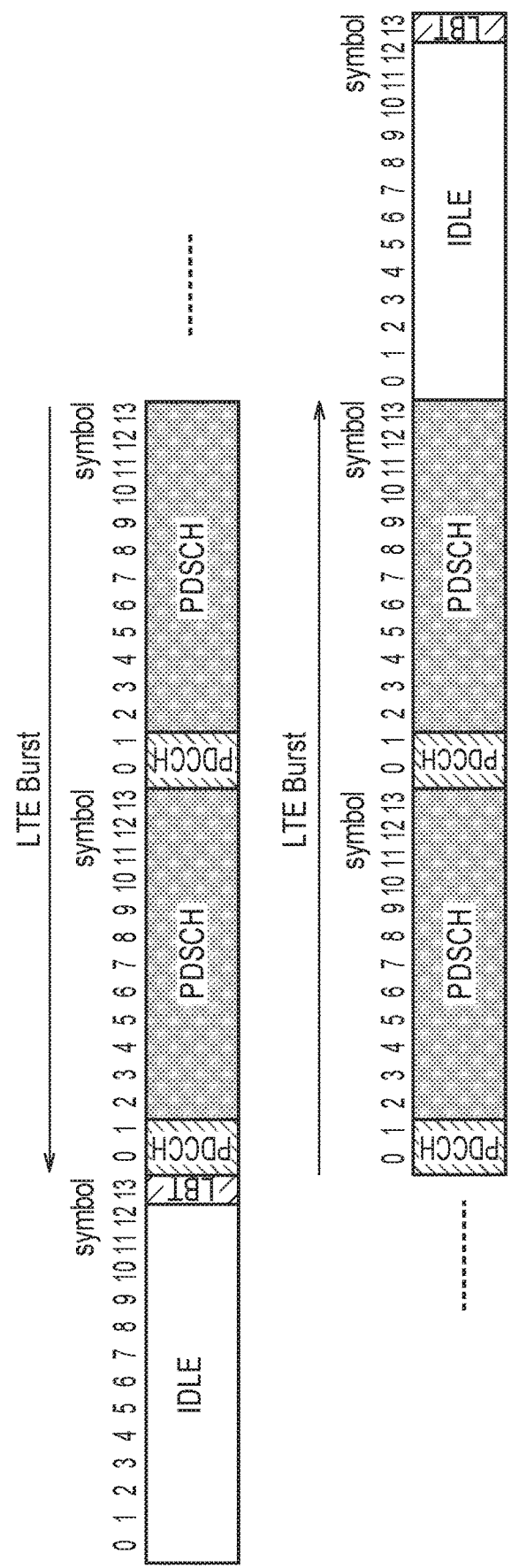
FIG. 21 is a diagram illustrating a baseline model according to an additional note 2.

In this section we describe an analysis of the proposed frame structure. Our view is to reuse as much as possible the existing LTE Rel-12 PHY design with minimal modifications for the LAA PHY design to meet the regulations requirements. RAN1 has agreed DL LAA design should assume subframe boundary alignment according to the Rel-12 CA timing relationships across serving cells aggregated by CA. The location of LBT should be designed taking into account the above restriction. We think the simplest approach is to have four contiguous subframes as one LTE Burst (FIG. 21). This design assumes one Idle-subframe for every one LTE burst and the LBT occurs during the last symbol of the Idle-subframe occurring just before the next LTE burst transmission.

The approach described above is called FBE. We found FBE can co-exist with Wi-Fi without significant changes. We understand in LBE has the flexibility to adjust the transmission durations and may provide better LAA performance compared to FBE approach. However, LBE requires a reservation channel and long reservation channel could cause waste of resources. In addition the exponential random backoff would be needed for Wi-Fi co-existence. Furthermore, the implementation and the standardization impact of FBE is much smaller than LBE.

In UL LAA, FBE is better than LBE if UE should perform LBT before the UL transmission. We believe eNB is expected to control UL Tx in the same manner as the existing UL scheduling even in LAA. In that case, it's not acceptable that UE transmit reservation signals on the unallocated resources i.e., before the granted resources. The question is whether it can be acceptable that LBE for DL in case of FBE for UL At least now, we think FBE should be a baseline both for DL and UL if UL LAA is supported. Therefore, we should study both LBE and FBE for DL LAA.

Proposal 3: Both LBE and FBE should be studied for DL LAA

We adopted the same frame structure of LTE in our simulations. As we show in our simulations, this design can achieve fair coexistence with Wi-Fi and other LAA services. Therefore, we propose this design should be the baseline of the LAA frame structure for FBE.

Proposal 4: For achieving fair coexistence with Wi-Fi and other LAA services, RAN1 should agree the following LTE Burst design is the baseline of the LAA frame structure for FBE.

have four contiguous subframes as one LTE Burst
one Idle-subframe for every one LTE burst
the LBT occurs during the last symbol of the Idle-subframe occurring just before the next LTE burst transmission (4. Potential Issue on FBE)

Figure 22:
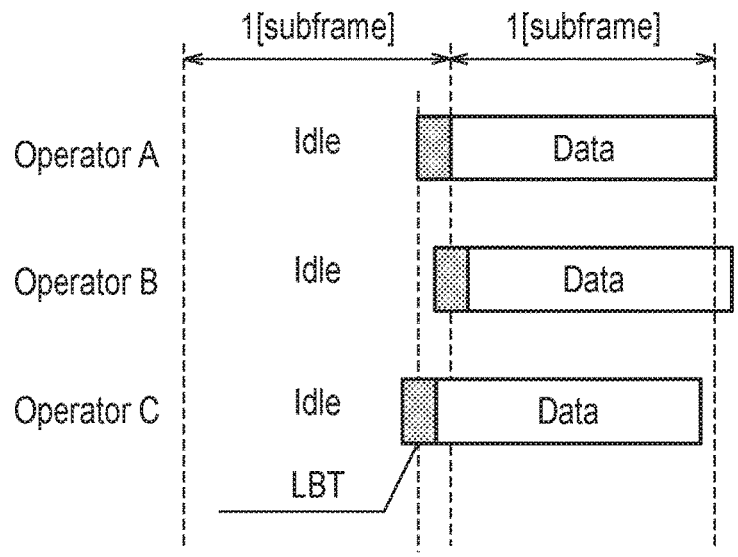
FIG. 22 is a diagram illustrating a potential problem of an FBE according to the additional note 2.

In original FBE, the timing of LBT is fixed. If the timing difference of Operator A and Operator B, C is small as shown in FIG. 22, if the LBT of all operators occur very close to each other then there is a possibility of collisions. Therefore, there is a need for a solution to avoid these collisions. There are several solutions and one of them is to detect other operator's timing and adjust LBT timing using small reservation signal.

Proposal 5: RAN1 should study to avoid collisions between neighboring cell transmission if their LBTs occur very close to each other.

APPENDIX 3

(1. Introduction)

Channel selection is one of the most important features in LAA operation. In addition the hidden node problem is worth studying when designing the channel selection procedures/schemes. In this contribution, we propose enhancements to the UE measurement for channel selection to achieve better performance.

(2. UE Measurement Report Enhancement for Channel Selection)

Figure 23:
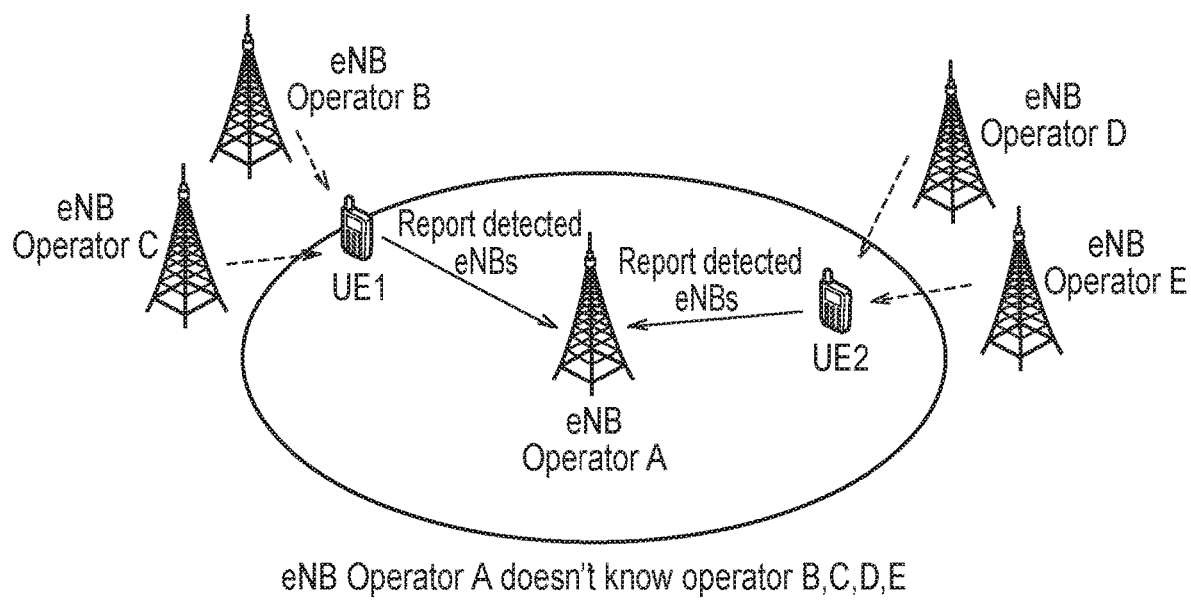
FIG. 23 is a diagram illustrating a UE measurement report according to an additional note 3.

To deal with the hidden node problem, we propose a UE measurement report mechanism. In the measurement report, UE report the detecting Cell ID and signal power on the unlicensed band in addition to the current RRM measurement result. In our view, UE can detect the non-serving cell's DRS (including other operator's LAA) and calculate the DRS RSRP by itself. The eNB that receives this report from the UE can take appropriate action needed to mitigate the hidden node problem. FIG. 23 and Table 1 is an example of proposed UE measurement report. In Table 1, UE1 can report to its serving cell indicating Operator B is operating in CC1 and Operator C is operating in CC2. As a result the serving eNB may choose to select CC3 or CC4 to serve its UEs.

TABLE 1

| UE | CC | Detected eNBs | eNB channel selection |
| --- | --- | --- | --- |
| UE 1 report | CC1 | eNB Operator B | |
| | CC2 | eNB Operator C | |
| | CC3 | Not detected | can be selected by eNB |
| | CC4 | Not detected | can be selected by eNB |
| UE 2 report | CC1 | eNB Operator D | |
| | CC2 | Not detected | can be selected by eNB |
| | CC3 | eNB Operator E | |
| | CC4 | Not detected | can be selected by eNB |

Proposal 1: New UE measurement report mechanism should be introduced that allows a UE to report the detected non-serving LAA cell's information.

In addition, there is a potential issue if the same PCI is used by multiple operators. Same PCI should not be allocated to the neighboring cell. Within an operator's network, it can be achieved by cell planning or SON function. However, the problem remains when the same PCI is used by other operators located in the proximity of the first operator. In our opinion, either the UE assisted or eNB based PCI collision avoidance mechanism in unlicensed spectrum should be introduced.

Proposal 2: PCI collision avoidance mechanism in unlicensed spectrum should be introduced.

In the Appendix 3, an interference power per CC may be reported (WiFi may be detected).

APPENDIX 4

(1. Introduction)

RAN1 is being requested to determine a single global solution for LAA. Therefore, one unified LAA solution meeting the regulations of each country or region should be studied. In this Appendix, we discuss the LAA Frame structure including the PDSCH and the reservation signal.

(2. Necessity of LBT in LAA)

We describe the necessity of LBT in LAA. RAN1 has agreed to introduce LBT and discontinuous transmission on a carrier with limited maximum transmission duration to meet the regulatory requirements for some of the regions/bands. Since a single global solution is required, we propose that the LBT and the discontinuous transmission should be mandatory for the LAA operation. Note these items are beneficial in achieving fair coexistence with other technologies such as Wi-Fi as well.

We also propose to limit the duration of the transmission bursts to maximum of 4 ms meeting the most stringent requirement i.e., Japanese regulation.

Proposal 1:
LBT and discontinuous transmission should be mandatory for the LAA operation.

Proposal 2: The maximum transmission duration of a transmission burst should be 4 ms.

(3. Analysis of Frame Structure)
Proposal 3: Both LBE and FBE should be studied for DL LAA Proposal 4: For achieving fair coexistence with Wi-Fi and other LAA services, RAN1 should consider the following FBE frame structure as the baseline:
  have four contiguous subframes in one LTE Burst
  one Idle-subframe for every one LTE burst
  the LBT occurs during the last symbol of the Idle-subframe occurring just before the next LTE burst transmission (4. Potential Issue Related to FBE)
Proposal 5: RAN1 should study to avoid collisions between neighboring cell's transmission if their LBTs occur very close to each other.

Figure 24:
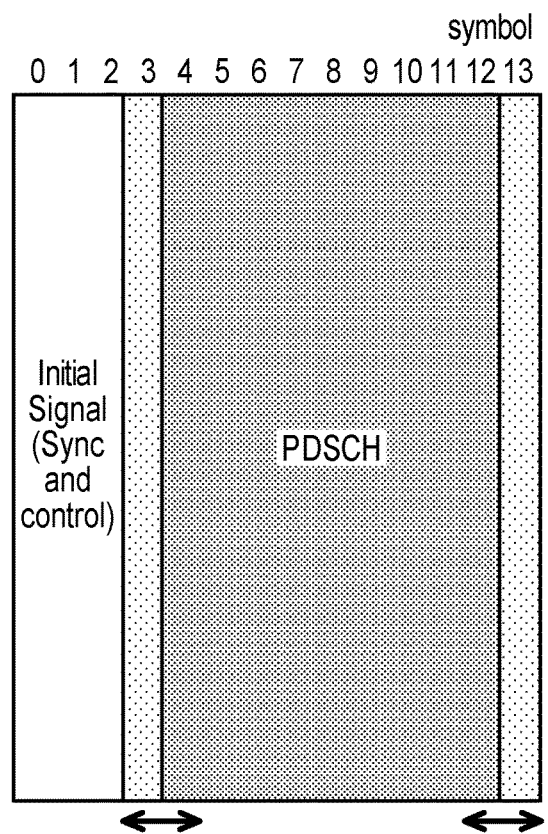
FIG. 24 is a diagram illustrating an example of an OFDM symbol for a PDSCH according to an additional note 4.

(5. Flexible PDSCH Transmission)
In this section we focus on the flexible PDSCH transmission. LAA supports transmitting PDSCH when not all OFDM symbols are available for transmission in a subframe according to LBT. FIG. 24 is an example for the case when not all the OFDM symbols are available for the PDSCH transmission. One possibility is flexible starting OFDM symbols and another is flexible ending OFDM symbols. In both cases, there's one issue about how UE know the transmission symbols, e.g. start symbol and end symbol. We believe it's beneficial that UE don't need to know the timing of start and end symbol. Therefore, RAN1 should consider flexible PDSCH symbols using of PDSCH are realized by puncturing.

Proposal 6: RAN1 should consider flexible PDSCH symbols using puncturing.

(6. Reservation Signal Design)
Reservation signal is needed when LBT is used and the start symbol of PDSCH is fixed. In such a case the reservation signal cannot consist of control signaling because the transmission of this reservation signal is opportunistic since sometimes the reservation signal may not be transmitted. Considering the above we believe the duration of the reservation signal should be as short as possible. In addition, we propose to use the copy of a portion of PDSCH as the reservation signal to utilize this period more effectively as shown in FIG. 25. This signal is useful for the improvement of the PDSCH performance.

Proposal 7: When designing reservation signal, the duration of the reservation signal should be as short as possible.

Proposal 8: The copy of PDSCH should be used as the reservation signal.

APPENDIX 5

(1. Introduction)
In this Appendix, we consider how to support multiplexing in frequency domain and multiplexing by MU-MIMO.

(2. Multiplexing in Frequency Domain)
The Nominal Channel Bandwidth shall be at least 5 MHz at all times. The Occupied Channel Bandwidth shall be between 80% and 100% of the declared Nominal Channel Bandwidth. In case of smart antenna systems (devices with multiple transmit chains) each of the transmit chains shall meet this requirement.

Figure 26:
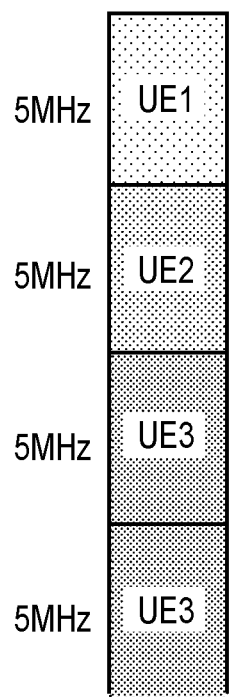
FIG. 26 is a diagram illustrating an example of multiplexing in a frequency domain for an LAA according to an additional note 5.

In order to meet this regulation, we believe a UE have to transmit at least a 5 MHz wide signal. Considering LBT, it's not possible to share 5 MHz with multiple UEs. In addition, the transmission should be permitted in multiples of 5 MHz and the start frequency position should be also as multiples of 5 MHz. If 20 MHz is available for LAA, only 4 UEs can be multiplexed in frequency domain as shown in FIG. 26.

Proposal 1: In UL LAA each UE should use at least 5 MHz. The transmission should be permitted in multiples of 5 MHz and the start frequency position should also be as a multiple of 5 MHz.

Figure 27:
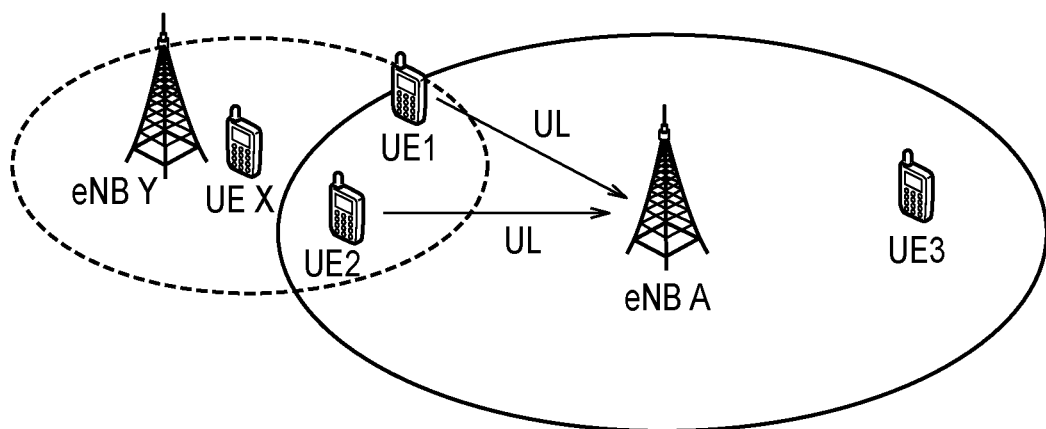
FIG. 27 is a diagram illustrating an example of an inappropriate pair for MU-MIMO according to the additional note 5.
Figure 28:
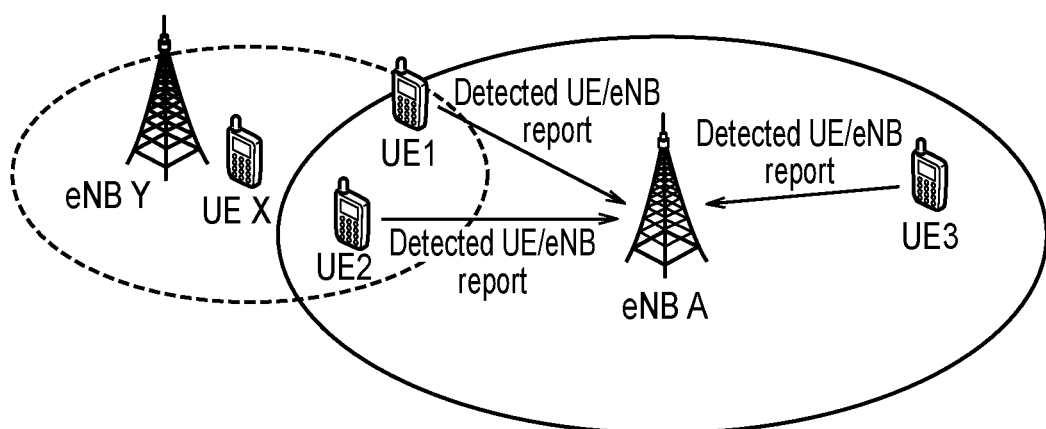
FIG. 28 is a diagram illustrating a measurement report for MU-MIMO according to the additional note 5.

(3. Multiplexing by MU-MIMO)
In this section, we consider the suitable UE-pairing for MU-MIMO. As shown in FIG. 27, the pairing of UE1 and UE2 is not suitable for MU-MIMO because if UE X or eNB Y start the transmission, both UE1 and UE2 cannot send data due to LBT failure. On the other hand, if UE 1 and UE3 were paired then it would have been a successful transmission using MU-MIMO because UE3 would be able to transmit.

Therefore, we believe some mechanism is needed such that the eNB can choose the suitable pair for MU-MIMO. One approach is the UEs can send a report to its serving cell that indicates all the neighboring UEs and the eNBs detected by the UE on the LAA carrier. Using the above example, if all the UEs send a report to eNB A then eNB A may not pair UE1 and UE 2 for a MU-MIMO transmission.

Proposal 2: LAA should support UEs to send a report to its serving cells to indicate the detected UEs and eNBs on the LAA carrier.

APPENDIX 6

(1. Introduction)
3GPP studied the use of unlicensed spectrum in combination with licensed spectrum and reported the results. Taking these results into consideration, RAN#68 approved a new WI "Licensed-Assisted Access using LTE" for specifying LAA SCells operations with only DL transmissions. In this Appendix, we provide our view on DL transmission design.

Figure 29:
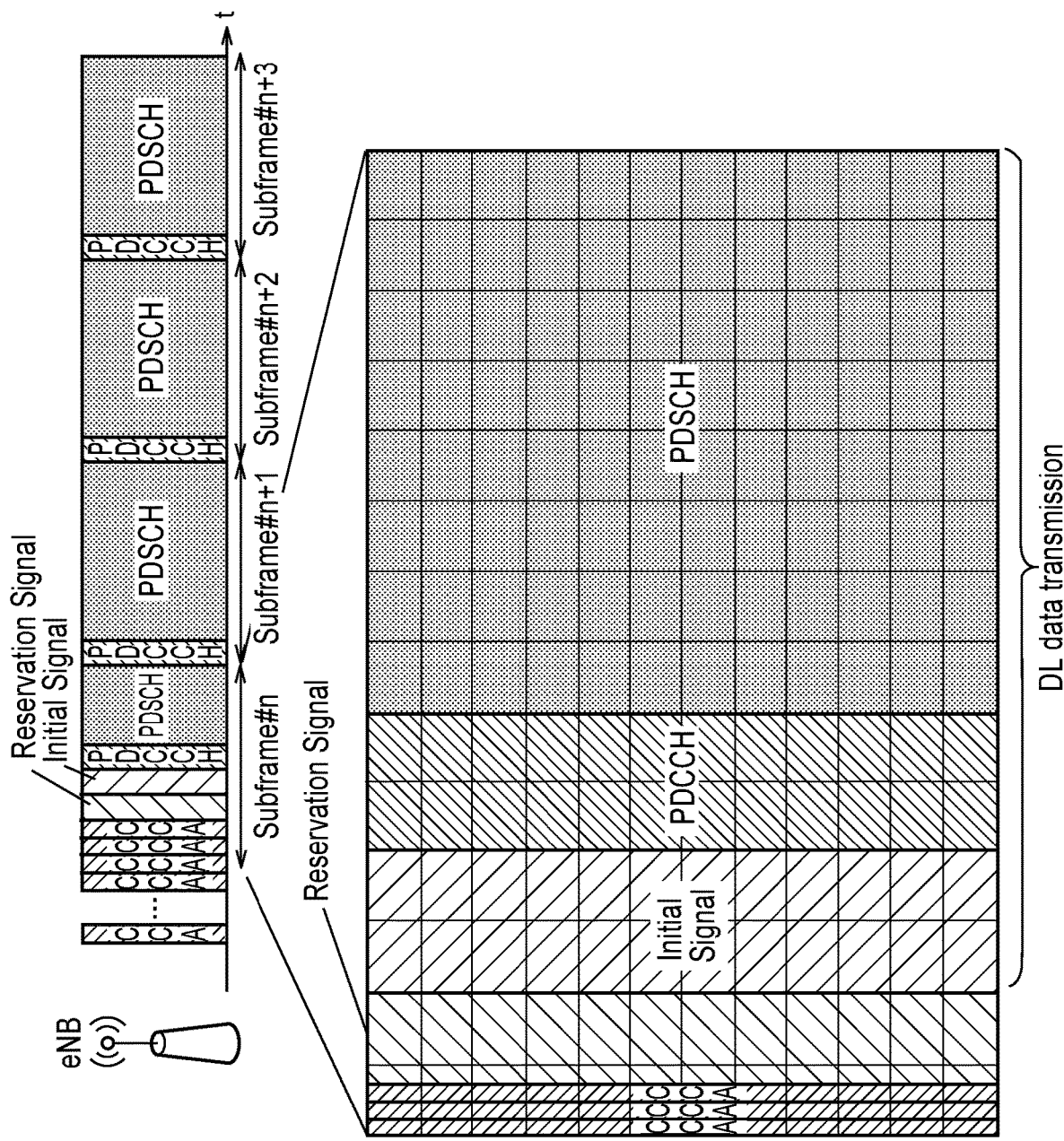
FIG. 29 is a diagram illustrating an overview of DL transmission according to an additional note 6.

(2. DL Transmission Design)
According to the reported results, Category 4 LBT mechanism is the baseline at least for LAA DL transmission bursts containing PDSCH. If Category 4 LBT mechanism is applied to PDSCH transmission, we need to discuss DL transmission timing, reservation signal which reserves the channel and initial signal which indicates UE a start timing of DL transmission. We show our overview of DL transmission design in FIG. 29. In this section, we discuss details of DL transmission timing and signal designs. In this Appendix, we refer to the part consisting of initial signal, PDCCH and PDSCH as DL data transmission.

DL Data Transmission Timing
CCA ends regardless of subframe boundary when Category 4 LBT mechanism is applied. After reservation signal transmission following CCA end, we have two choices on DL data transmission start timing; whether DL data transmission should always start after waiting until the next subframe boundary or not.

Figure 30:
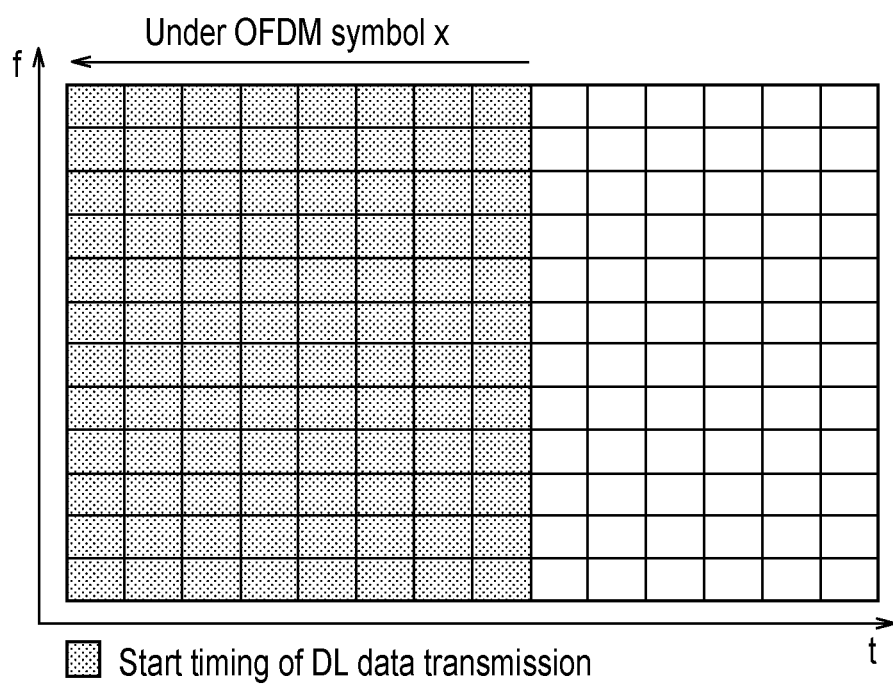
FIG. 30 is a diagram illustrating a start timing of DL data transmission according to an additional note 6.

Considering the frequency efficiency, DL data transmission should be able to start without waiting until the next subframe boundary especially when maximum DL transmission burst duration is short (e.g. max 4 ms burst in Japan regulation). For example, when reservation signal is transmitted during all over partial subframe, reservation signal occupies maximum 25% of DL burst transmission in case of 4 ms burst transmission. However, supporting all OFDM symbols as start timing candidates leads computationally intensive and complex in both eNB and UE. For example, eNB should prepare plurality of packets with different TBSs for PDSCH because eNB cannot realize the CCA ending point before trying CCA process. Additionally, UE must search all the possible start timings of DL data transmission because UEs don't know when eNBs start DL data transmission. This makes UEs more complex and computationally intensive than traditional manner. One solution is limiting the start timings of OFDM symbols. Besides, we assume limited start timing should be located earlier than certain OFDM symbol x in subframe (FIG. 30). If start timing is located later than certain OFDM symbol x in subframe, coding rate of PDSCH might be too high to be decoded, which makes UE cannot decode the PDSCH correctly without retransmission. The value of x is FFS.

Proposal 1: Limiting the start timing of DL data transmission is preferable from the aspect of eNB and UE computational load and complex. Additionally, candidate of limited start timing should be located earlier than certain OFDM symbol x in subframe.

Reservation Signal

There is a time gap between CCA end and start timing of DL data transmission. If eNB doesn't transmit anything during this time gap, other devices (e.g. APs or other operator's eNB) may transmit any signals. Therefore, eNB should transmit the reservation signal.

Proposal 2: Reservation signal should be used to prevent interruption by other devices.

Figure 31A:
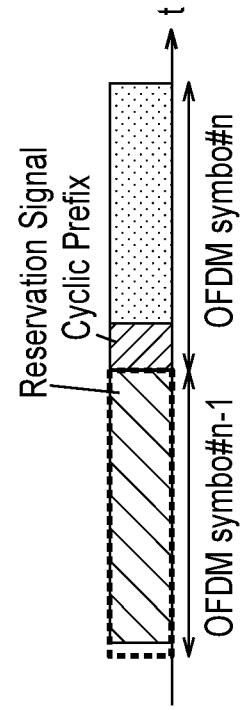
FIGS. 31A and 31B are diagrams illustrating a case of a reservation signal in one OFDM symbol according to the additional note 6.
Figure 31B:
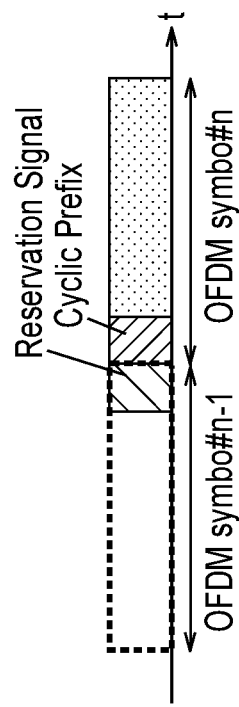

The reservation signal is divided into two patterns according to whether length of reservation is shorter than an OFDM symbol or not. If time length of reservation signal is shorter than one OFDM symbol, this gap is not long enough to transmit any data. However, eNB can transmit the CP (cyclic prefix) extension of next OFDM symbol in this gap (see FIG. 31A). The transmission of the CP extension improves the detection performance of the initial signal. However, if the total duration of the reservation signal that includes the CP extension portion and the next OFDM symbol CP is greater than one effective OFDM symbol length then UE may not be able to determine the symbol-timing due to dual-peak detection. (e.g. reservation signal=60 us and CP=16.7 us) (FIG. 31B).

Proposal 3: In the case that reservation signal is shorter than one OFDM symbol, at least a part of reservation signal should be used as CP extension. However, the total duration of CP extension and the next OFDM symbol CP should be shorter than the effective OFDM symbol length.

On the other hand, if time length of reservation signal is longer than one OFDM symbol, eNB would transmit redundant data which may be used for supporting DL data transmission. However, reservation signal shouldn't include any critical data which UE must receive. One option is using as the CP extension just before the start timing of DL data transmission only.

Proposal 4: When reservation signal is longer than one OFDM symbol, reservation signal shouldn't include any critical data which UE must receive in order to avoid UE complexity.

Initial Signal

Figure 32:
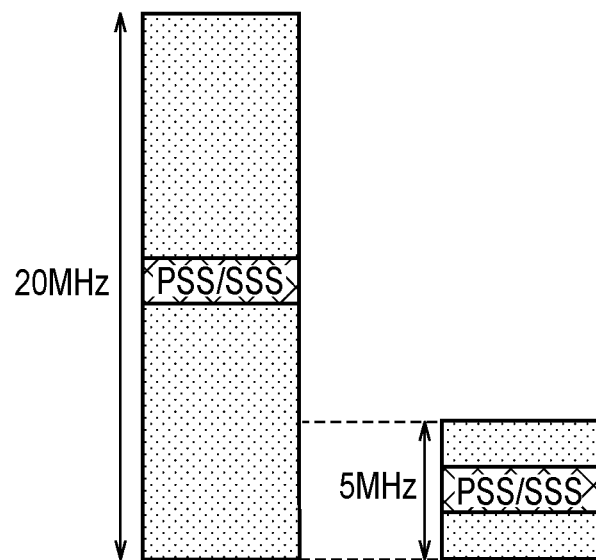
FIG. 32 is a diagram illustrating an example of a partially overlapping case according to the additional note 6.
Figure 33:
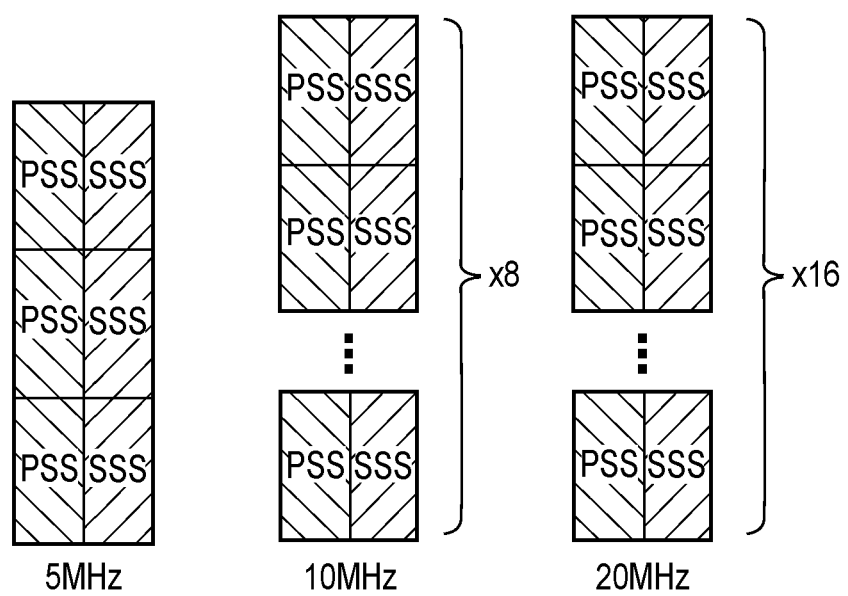
FIG. 33 is a diagram illustrating an initial signal having two OFDM symbols according to the additional note 6.

UE needs to be aware of start timing of DL data transmission. UE would perform blind decoding to detect the start timing of DL data transmission at every candidate timings. However, blind decoding requires computationally intensive for the UE. It is preferable to define an initial signal to notify the start timing of DL data transmission. One candidate signal is PSS/SSS within one or two OFDM symbol(s) which is easy to detect. However, legacy PSS/SSS maps in the center of system bandwidth (FIG. 32). This does not allow to reserve the channel with respect to devices operating in the partial bandwidth overlapping cases. One solution is to map multiple PSS/SSS within the bandwidth shown by FIG. 5.

Proposal 5: Initial Signal is used for indicating the start timing of DL data transmission and maps multiple PSS/SSS within one or two OFDM symbols.

On the other hand, UE cannot understand whether this signal is initial signal or DRS if the same physical designs are used. One simple solution is using the different sequence of SSS between DRS and initial signal.

PDCCH/PDSCH

Basically, we assume the PDCCH and PDSCH format is not changed except preparing the multiple DCIs and packets with different TBSs for PDSCH, because eNB is not aware in advance when the CCA ends. Additionally, we need to define new TBS to adopt the partial subframe. One simple approach is to change the TBSs in proportion to the number of available OFDM symbols for PDSCH. For example, when available OFDM symbols is 5 with normal CP, transmitting TBS is floor (5/14 TBS/8)*8.

If eNB couldn't support to prepare multiple packets with different TBSs for PDSCH, another way to resolve this issue is to have the eNB to transmit the smallest packet for the worst case number of OFDM symbols available. The resolution has lower complexity in exchange of higher partial subframe transmission inefficiency.

Proposal 6: RAN1 should consider different TBS sizes to handle different transmission durations.

The invention claimed is:

1. A user terminal used in a 3GPP mobile communication system, comprising:
   a receiver configured to receive a measurement instruction to instruct measurement in an unlicensed band, from a base station;
   a controller configured to: in response to reception of the measurement instruction, detect a cell of the 3GPP mobile communication system in the unlicensed band, and measure reception power of a radio signal of the cell, even when a cell identifier of a measurement target cell is not designated in the measurement instruction; and
   a transmitter configured to transmit a first measurement report including a cell identifier of the cell and a measurement result of the reception power, to the base station, wherein
   the measurement instruction includes information designating a frequency channel of a measurement target in the unlicensed band,
   the controller is further configured to
      measure signal strength of radio signals transmitted in the frequency channel, and
      determine occupancy situation of the frequency channel based on the measured signal strength and a threshold, and
   the transmitter is further configured to transmit a second measurement report including information indicating the occupancy situation of the frequency channel.

2. The user terminal according to claim 1,
wherein the measurement instruction includes information designating a frequency channel of a measurement target in the unlicensed band, and
the controller is configured to search for a radio signal transmitted in the frequency channel designated by the measurement instruction.

3. The user terminal according to claim 1,
wherein the controller is configured to
search for the radio signal transmitted from the cell of the 3GPP mobile communication system in the unlicensed band, and
measure the reception power of the radio signal detected by the search, and
the transmitter is configured to transmit the measurement report including a cell identifier of a transmission source cell of the detected radio signal and the measurement result of the reception power.

4. The user terminal according to claim 3,
wherein the controller is configured to
search for the radio signal transmitted from a cell belonging to an operator different from an operator to which the base station belongs, and
measure the reception power of the radio signal detected by the search.

5. The user terminal according to claim 4,
wherein the cell identifier includes operator information indicating an operator to which the transmission source cell belongs.

6. The user terminal according to claim 3,
wherein the radio signal is a synchronization signal, a reference signal, or a beacon signal.

7. The user terminal according to claim 1,
wherein the controller is configured to
search for the radio signal transmitted from an apparatus of a system different from the 3GPP mobile communication system, and
measure the reception power of the radio signal detected by the search.

8. A method performed at a user terminal used in a 3GPP mobile communication system, comprising:
receiving a measurement instruction to instruct measurement in an unlicensed band, from a base station;
in response to reception of the measurement instruction, detecting a cell of the 3GPP mobile communication system in the unlicensed band, even when a cell identifier of a measurement target cell is not designated in the measurement instruction;
measuring reception power of a radio signal of the cell; and
transmitting a first measurement report including a cell identifier of the cell and a measurement result of the reception power, to the base station, wherein
the measurement instruction includes information designating a frequency channel of a measurement target in the unlicensed band,
the measuring further comprises
measuring signal strength of radio signals transmitted in the frequency channel, and
determining occupancy situation of the frequency channel based on the measured signal strength and a threshold, and
the transmitting further comprises transmitting a second measurement report including information indicating the occupancy situation of the frequency channel.

9. A 3GPP mobile communication system, comprising:
a base station; and
a user terminal comprising:
a receiver configured to receive a measurement instruction to instruct measurement in an unlicensed band, from the base station;
a controller configured to: in response to reception of the measurement instruction, detect a cell of the 3GPP mobile communication system in the unlicensed band, and measure reception power of a radio signal of the cell, even when a cell identifier of a measurement target cell is not designated in the measurement instruction; and
a transmitter configured to transmit a first measurement report including a cell identifier of the cell and a measurement result of the reception power, to the base station, wherein
the measurement instruction includes information designating a frequency channel of a measurement target in the unlicensed band,
the controller is further configured to
measure signal strength of radio signals transmitted in the frequency channel, and
determine occupancy situation of the frequency channel based on the measured signal strength and a threshold, and
the transmitter is further configured to transmit a second measurement report including information indicating the occupancy situation of the frequency channel.

* * * * *